United States Patent [19]

Corwin et al.

[11] 4,198,685
[45] Apr. 15, 1980

[54] TEXT EDITING SYSTEM HAVING FLEXIBLE REPETITIVE OPERATION CAPABILITY WITH KEYBOARD INTERACTIVE FEATURE

[75] Inventors: Daniel W. Corwin, Dunstable; Harold S. Koplow, Lynnfield; David Moros, Winchester; Paul Anagnostopoulos, Burlington, all of Mass.

[73] Assignee: Wang Laboratories, Inc., Lowell, Mass.

[21] Appl. No.: 959,649

[22] Filed: Nov. 13, 1978

[51] Int. Cl.² ............................ G06F 3/02; G06F 3/14
[52] U.S. Cl. ..................................................... 364/900
[58] Field of Search ............................. 364/200, 900

[56] References Cited

U.S. PATENT DOCUMENTS

| | | | |
|---|---|---|---|
| 3,760,375 | 9/1973 | Irwin et al. | 364/200 |
| 3,805,249 | 4/1974 | Rich | 364/200 |
| 3,848,232 | 11/1974 | Leibler et al. | 364/200 |
| 3,898,622 | 8/1975 | Maynard et al. | 364/200 |
| 4,020,024 | 8/1977 | Cowe et al. | 364/900 |
| 4,056,821 | 11/1977 | Vittorelli | 364/900 |
| 4,137,564 | 1/1979 | Spencer | 364/200 |
| 4,150,429 | 4/1979 | Ying | 364/200 |

*Primary Examiner*—Harvey E. Springborn

[57] ABSTRACT

An improvement in a text-editing system having a keyboard for inputting character and text-editing operation signals, a CRT display, display storage and text storage, and additional special condition storage; the system responds to a select/store signal to select a sequence of signals from text storage and store it into special condition storage, and thereafter responds to a recall signal to disable the keyboard, retrieve the stored sequence, and operate according to it. A keyboard interactive operation signal can be stored as part of such a sequence. The system responds to retrieval of this signal to permit input of a keystroke string through the keyboard to the display storage and text storage; the system further responds to a keystroke string end indicator, input through the keyboard, to resume recall and execution of the stored sequence.

3 Claims, 21 Drawing Figures

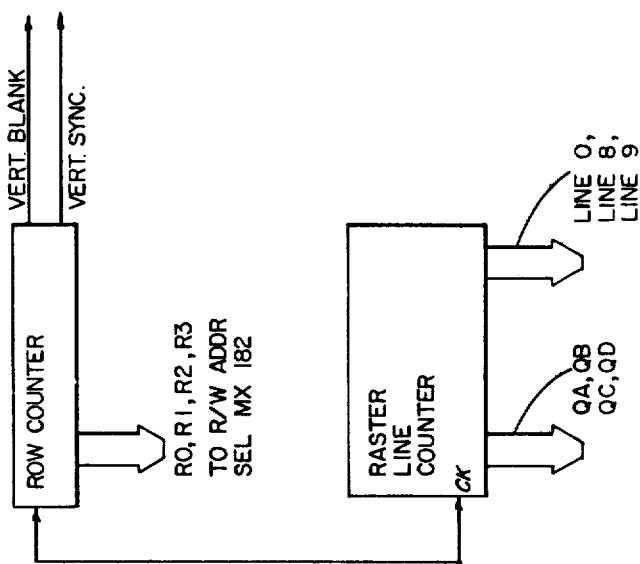
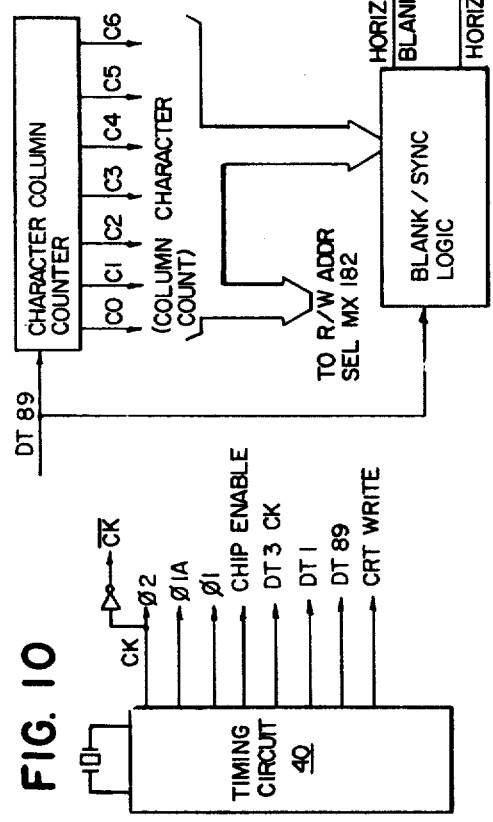
FIG. 10
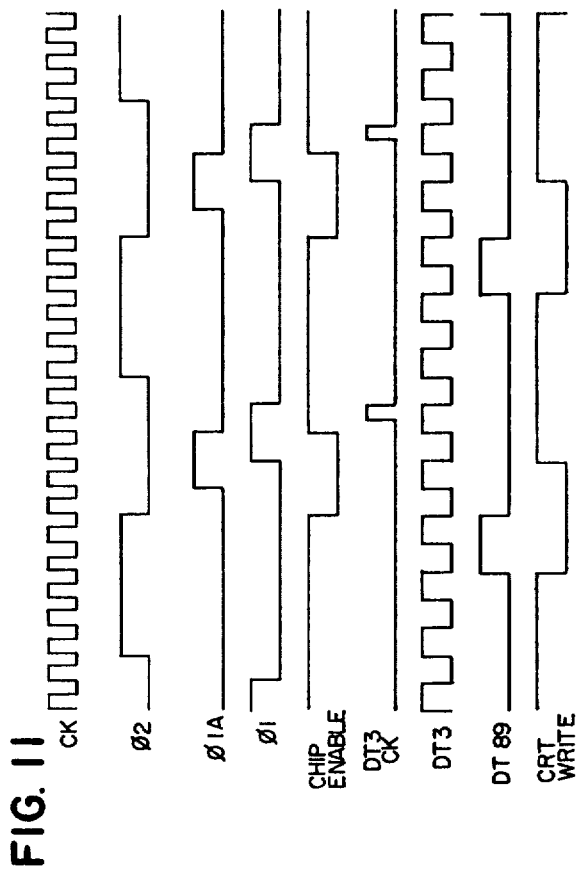
FIG. 11

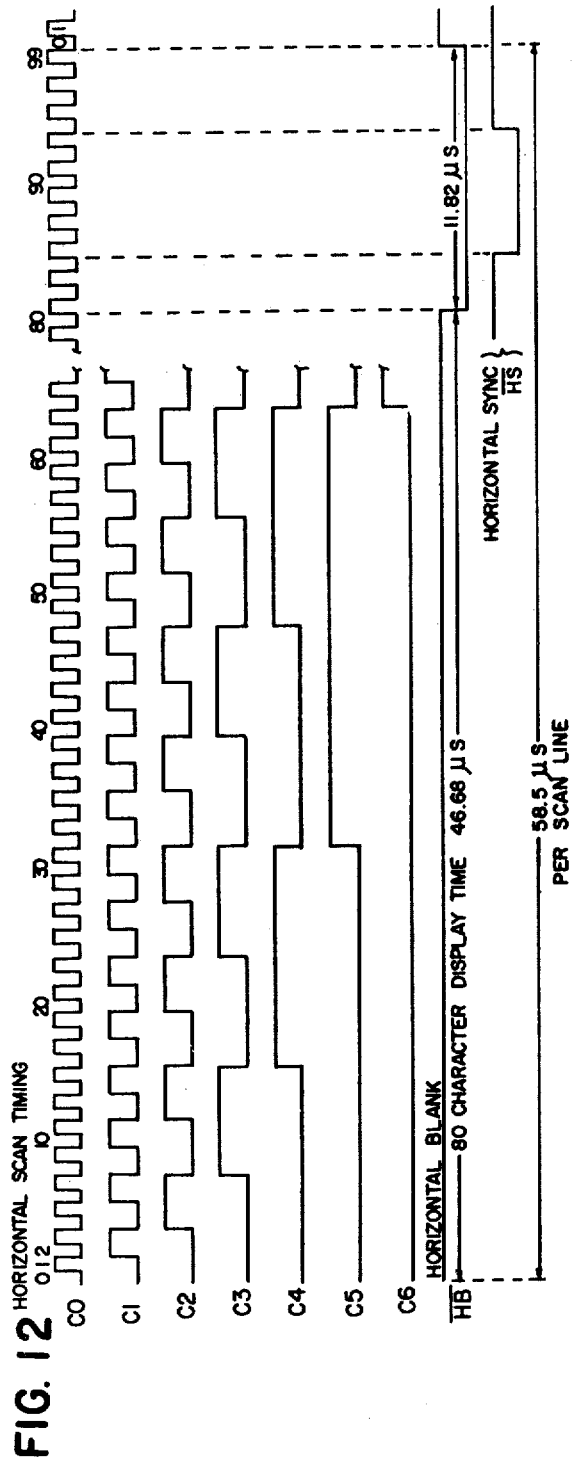
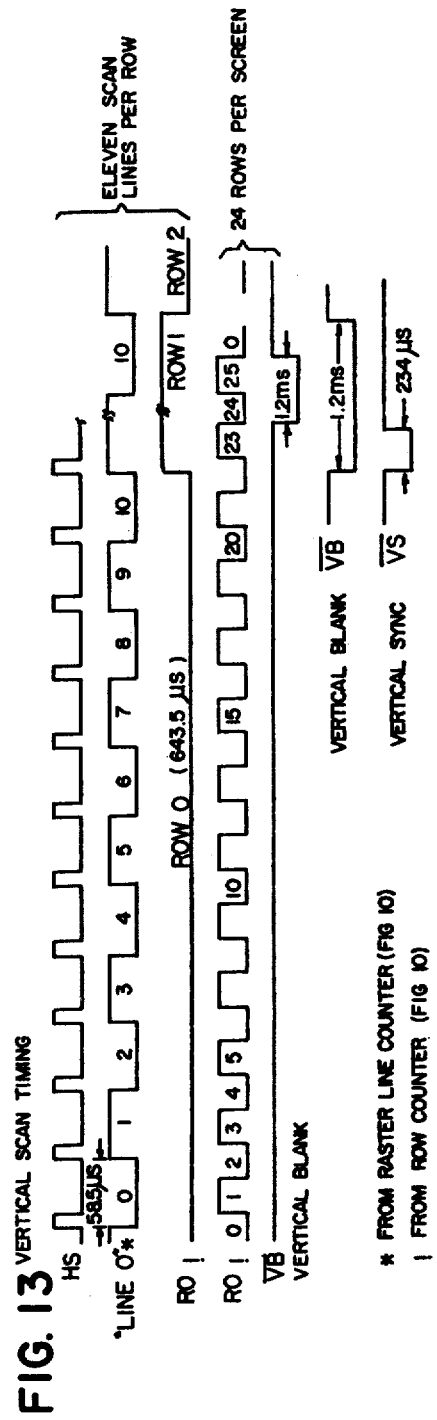

TABLE OF INTERNAL REPRESENTATIONS OF CHARACTERS AND OPERATIONS

| BINARY (Low) | HEX (Low) | 0 | 1 | 2 | 3 | 4 | 5 | 6 | 7 | 8 | 9 |
|---|---|---|---|---|---|---|---|---|---|---|---|
| 0 0 0 0 | 0 |  |  |  | 0 | @ | P | ` | p | CAN | CN |
| 0 0 0 1 | 1 | CTR | ! | 1 | A | Q | a | q |  | CMD | CW |
| 0 0 1 0 | 2 | TAB | " | 2 | B | R | b | r |  | EX | CS |
| 0 0 1 1 | 3 | RET | # | 3 | C | S | c | s |  | INS | CE |
| 0 1 0 0 | 4 | IND | $ | 4 | D | T | d | ˙t | DEL | BKS |
| 0 1 0 1 | 5 | DAL | % | 5 | E | U | e | u | PVS | UND |
| 0 1 1 0 | 6 |  | & | 6 | F | V | f | v | NXS | FMT |
| 0 1 1 1 | 7 |  | ' | 7 | G | W | g | w | PAG | SCH |
| 1 0 0 0 | 8 |  | ( | 8 | H | X | h | x | fmt | REP |
| 1 0 0 1 | 9 |  | ) | 9 | I | Y | i | y | sch | COP |
| 1 0 1 0 | A |  | * | : | J | Z | j | z | rep |  |
| 1 0 1 1 | B | STP | + | ; | K | [ | k |  | cop |  |
| 1 1 0 0 | C | NOT | , |  | L |  | l |  | MOV |  |
| 1 1 0 1 | D | mg | - | = | M | ] | m |  | MG |  |
| 1 1 1 0 | E |  | . |  | N |  | n |  | GO |  |
| 1 1 1 1 | F |  | / | ? | O |  | o |  | SC | S/S |

(REFER TO FIG. 17 FOR FULL NAMES OF OPERATIONS)

FIG. 17

| I (DISPLAYABLE) | II ABBREVIATION | III (NOT DISPLAYABLE) | IV NAME OF OPERATION | V "KEY-NAME" |
|---|---|---|---|---|
| | BKS | 94 | BACKSPACE | (-BACKSPACE-) |
| | CAN | 80 | CANCEL | (-CANCEL-) |
| | CMD | 81 | COMMAND | (-COMMAND-) |
| 01 | CTR | | CENTER | (-CENTER-) |
| | cop | 8B | COPY (L.C.) | (-COPY-) |
| | COP | 99 | COPY (U.C.) | (-SUPER-COPY-) |
| | CE | 93 | CURSOR EAST (RIGHT) | (-EAST-) |
| | CN | 90 | CURSOR NORTH (UP) | (-NORTH-) |
| | CS | 92 | CURSOR SOUTH (DOWN) | (-SOUTH-) |
| | CW | 91 | CURSOR WEST (LEFT) | (-WEST-) |
| 05 | DAL | | DECIMAL TAB | (-DEC-TAB-) |
| | DEL | 84 | DELETE | (-DELETE-) |
| | EX | 82 | EXECUTE | (-EXECUTE-) |
| | fmt | 8B | FORMAT (L.C.) | (-FORMAT-) |
| | FMT | 96 | FORMAT (U.C.) | (-EDIT-FORMAT-) |
| | SC | 8F | SPECIAL INPUT CONDITION | (-GLOSSARY-) |
| | GO | 8E | GO TO PAGE | (-GO-TO-PAGE-) |
| 04 | IND | | INDENT | (-INDENT-) |
| | INS | 83 | INSERT | (-INSERT-) |
| 0D | mg | | SWITCH DOCUMENT (L.C.) | (-MERGE-) |
| | MG | 8D | DON'T SWITCH DOCUMENT (U.C.) | (-DON'T-MERGE-) |
| | MOV | 8C | MOVE | (-MOVE-) |
| 0C | NOT | | NOTE | (-NOTE-) |
| | NXS | 86 | NEXT SCREENLOAD | (-NEXT-SCRN-) |
| | PVS | 85 | PREVIOUS SCREENLOAD | (-PREV-SCRN-) |
| | PAG | 87 | PAGE | (-PAGE-) |
| 03 | RET | | RETURN | (-RETURN-) |
| | rep | 8A | REPLACE (L.C.) | (-REPLC-) |
| | REP | 98 | REPLACE (U.C.) | (-GLOBL-REPLC-) |
| 20 | SP | | SPACE BAR | |
| | sch | 89 | SEARCH (L.C.) | (-SEARCH-) |
| | SCH | 97 | SEARCH (U.C.) | (-SEARCH-ALL-) |
| 0B | STP | | STOP CODE | (-STOP-) |
| 02 | TAB | | TABULATION | (-TAB-) |
| | UND | 95 | UNDERSCORE | (-UNDERSCORE-) |

FIG. 18

TABLE OF INTERNAL REPRESENTATIONS
AND CORRESPONDING DISPLAYABLE
GRAPHICS AND CHARACTERS

| HIGH DIGIT BINARY | 0 0 0 | 0 0 1 | 0 1 0 | 0 1 1 | 1 0 0 | 1 0 1 | 1 1 0 | 1 1 1 |
|---|---|---|---|---|---|---|---|---|
| HEX | 0 | 1 | 2 | 3 | 4 | 5 | 6 | 7 |

| LOW DIGIT BINARY | HEX | 0 | 1 | 2 | 3 | 4 | 5 | 6 | 7 |
|---|---|---|---|---|---|---|---|---|---|
| 0 0 0 0 | 0 | | | | 0 | @ | P | ° | p |
| 0 0 0 1 | 1 | ♦ | | ! | 1 | A | Q | a | q |
| 0 0 1 0 | 2 | ▶ | | " | 2 | B | R | b | r |
| 0 0 1 1 | 3 | ◀ | | # | 3 | C | S | c | s |
| 0 1 0 0 | 4 | → | | $ | 4 | D | T | d | t |
| 0 1 0 1 | 5 | ← | | % | 5 | E | U | e | u |
| 0 1 1 0 | 6 | | | & | 6 | F | V | f | v |
| 0 1 1 1 | 7 | | | ' | 7 | G | W | g | w |
| 1 0 0 0 | 8 | | | ( | 8 | H | X | h | x |
| 1 0 0 1 | 9 | | | ) | 9 | I | Y | i | y |
| 1 0 1 0 | A | | | * | : | J | Z | j | z |
| 1 0 1 1 | B | ■ | | + | ; | K | [ | k | |
| 1 1 0 0 | C | ‼ | | , | | L | | l | |
| 1 1 0 1 | D | ↕ | | - | = | M | ] | m | |
| 1 1 1 0 | E | | | . | | N | | n | |
| 1 1 1 1 | F | | | / | ? | O | | o | |

TEXT EDITING SYSTEM HAVING FLEXIBLE REPETITIVE OPERATION CAPABILITY WITH KEYBOARD INTERACTIVE FEATURE

Text-editing systems having keyboards for the input of text characters and text-modifying operations, and having CRT displays for the display of entered text as modified by operations thereon, are in general well known, and have provided convenient and efficient means for typing, editing and printing text.

In our application Ser. No. 959,704, filed Nov. 13, 1978, and assigned to the same assignee as the present invention, there is disclosed an improvement in a text-editing system that modifies an existing generally well-known type of text-editing system to provide the capability for the user to enter selected sequences of characters and operations in a special mode for storage and later repetitive execution as needed. The present invention further modifies such a system by providing a keyboard interactive feature usable in connection with such stored selected sequences, which results in a far more flexible and powerful editing system.

In certain applications of such a text-editing system, known as forms-filling, certain text (the form) may be stored in memory, using the repetitive operation capability disclosed and claimed in our said application, while other material is to be inserted in the form at particular locations therein. In text-editing systems of the type disclosed herein, a "cursor" or position indicator is provided on the CRT display, and keys are provided on the keyboard by which the user moves the cursor to a location at which text is to be modified. In filling out a form, a sequence of operations is performed to move the cursor to indicate the successive locations at which material is to be entered into the form. For example, if the cursor has an initial (home) position at the top left corner of the display, while the first insertion is to be made at a point four lines below and several spaces to the right, the position indicator must be moved by actuating the "return" key four times, then actuating the tab key twice, after which a first individual insertion is typed, and so on through the form.

It would be advantageous to avoid much of the repetitive operation of moving the position indicator. Using the invention disclosed in our said application it would be possible to store and recall each particular sequence of cursor movement operations. However, several such sequences, each slightly different, would be required for the entire form; each sequence must be separately identified and recalled, and the user must remember the order in which they are to be recalled. It would be more efficient to be able to store the entire sequence of cursor motions as a single entity, while providing the capability to accept entries through the keyboard at the necessary points in the sequence.

In many other types of text-editing operations, it is also desirable to provide a keyboard interactive operation as an element in a stored, recallable sequence of operations selected by the system user for a particular application.

Therefore, it is an object of this invention to provide, as an improvement in a text-editing system having repetitive operation capability, a keyboard interactive feature.

According to the invention, an improvement is provided in a text-editing system having keyboard signal input means for inputting signals including a select/store signal, a recall signal, a keystroke string end indicator signal, and character and text-editing operation signals in two alternative modes. The system has storage means including current document storage and special condition storage, and display means including display control means and display storage. The system further has system control means connected to the signal input means, storage means, and display means and having read/write control means and addressing means for generating a next address for the next read/write operation. The system control means is responsive to the character and text-editing operation signals to control the addressing means and read/write control means for the text-editing operation of the system. The system control means is responsive to the input of the character and operation signals in one of the alternative modes for controlling the addressing and read/write control means to store mode-modified representations of the signals in the current document storage and display storage. The system control means further comprises select/store means responsive to the select/store signal to select from the current document storage character and operation signals modified according to a first alternative mode and to store them into the special condition storage, the system control means being thereafter responsive to a recall signal to disable the keyboard signal input means, to retrieve stored character and operation signals from the special condition storage and to operate according to the retrieved signals.

According to the improvement, the system further comprises keyboard interactive operation means for permitting input through the keyboard during operation responsive to a recall signal. The keyboard signal input means further comprises means for inputting a keyboard interactive operation signal, and the system control means further comprises a keyboard interactive operation circuit, an interactive flag, and a saved address register coupled to the addressing means and read/write control means. The system control means is responsive to the keyboard interactive operation signal to store an internal representation of the signal in the current document storage; the select/store means is responsive to a retrieved internal representation of the signal to store an executable representation of the signal into the special condition storage.

The system control means is thereafter, during operation responsive to a recall signal, responsive to a retrieved executable representation of the keyboard interactive operation signal to enable the keyboard signal input means, set the interactive flag, and save the next address in the saved address register. The keyboard interactive operation circuit is thereafter responsive to the set interactive flag and to the keyboard input of character signals to store the character signals into the display storage and current document storage, and responsive to the keyboard input of the string end indicator signal to disable the keyboard signal input means, reset the interactive flag, and restore the saved next address.

Other objects, features and advantages will appear from the following description of a preferred embodiment of the invention, taken together with the attached drawings thereof, in which:

FIG. 10 shows the generation of timing and count signals used in the system;

FIG. 11 is a timing diagram of the timing signals of FIG. 10;

FIG. 12 is a timing diagram of the horizontal scan timing of the display means of FIG. 2 generated as shown in FIG. 10;

FIG. 13 is a timing diagram of the vertical scan timing of the display means of FIG. 2 generated as shown in FIG. 10;

FIG. 15 is a table listing the conversion between external signals and internal representations of characters and text-modifying operations;

FIG. 16 shows the internal representations in the form of words of binary bits;

Figure 6:
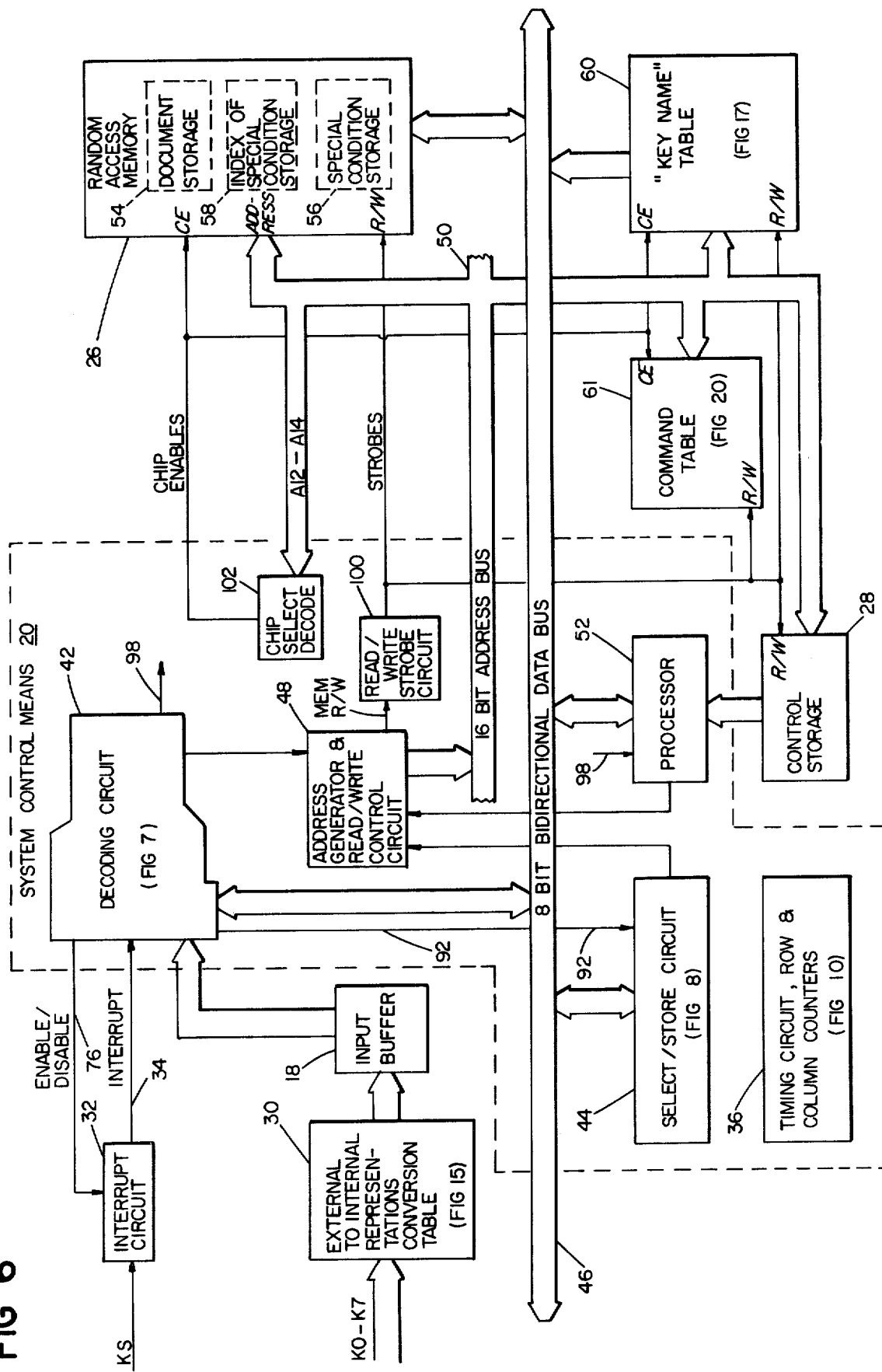
FIG. 6 is a diagrammatic showing of portions of FIG. 2, in greater detail.
Figure 20:
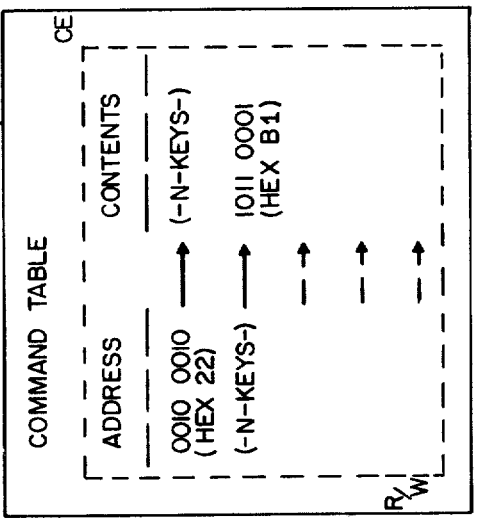
Figure 19:
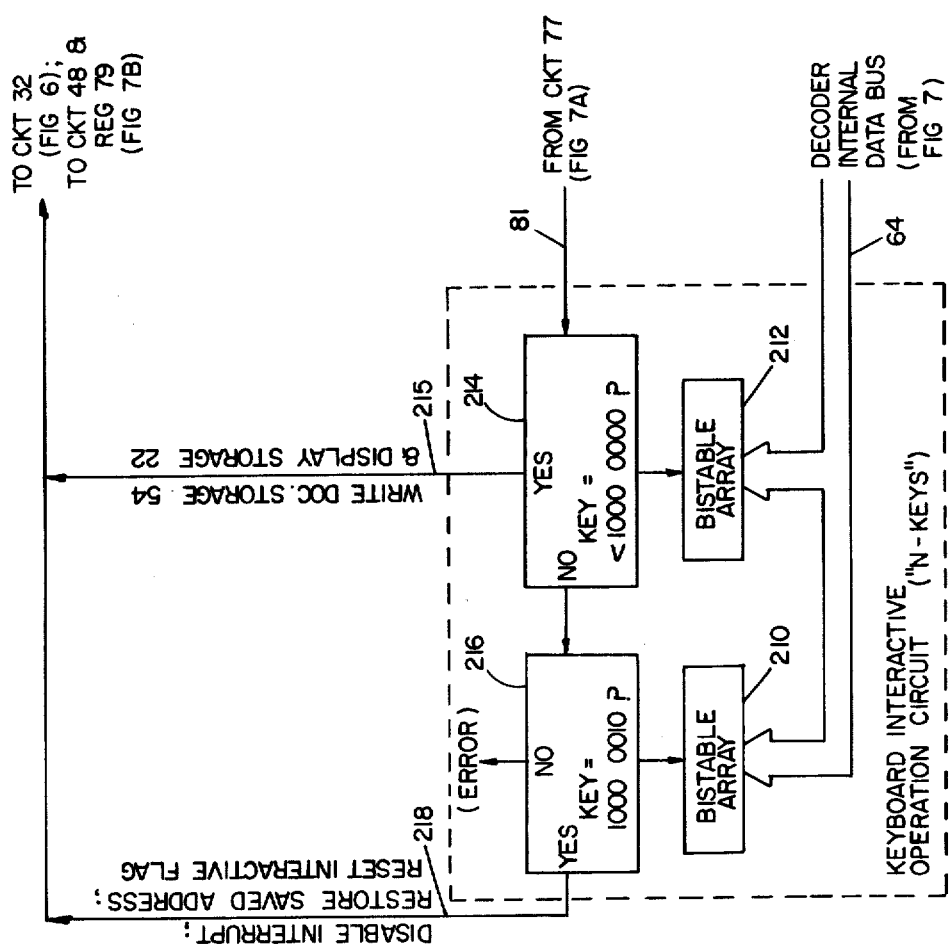

FIG. 17 lists the keys of the keyboard with their abbreviated names and their "key-names";

FIG. 18 lists the codes that can be stored in the character portion of the display storage, and the corresponding display symbols derived from the character generator, FIG. 19 shows the keyboard interactive operation circuit; and FIG. 20 shows the relevant contents of the Command Table of FIG. 6.

Figure 1:
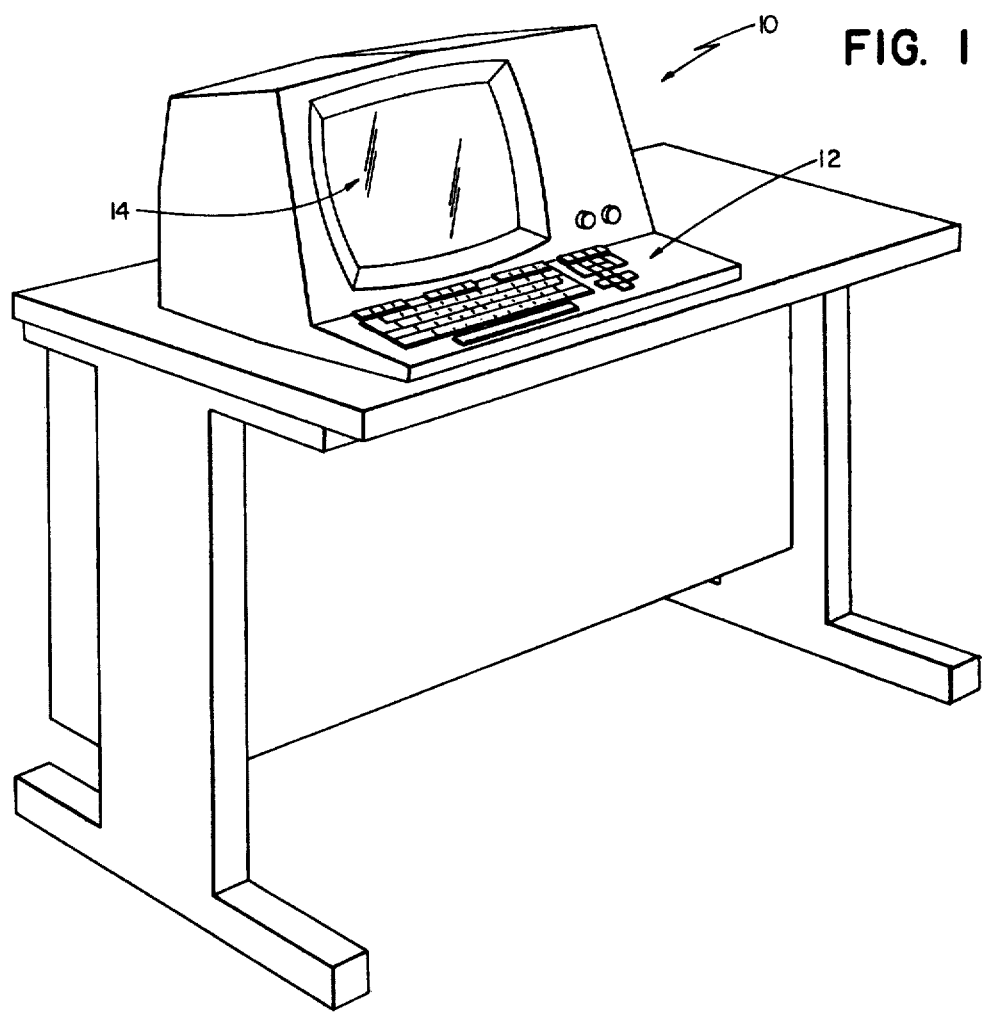
FIG. 1 is a view of the exterior of a text editing system of the type modified according to the invention.

Referring now to the drawing, and particularly to FIG. 1, a text-editing system of the type modified according to the invention is housed in a housing 10, and provides a keyboard 12 for the input of characters and of text-modifying operational signals, and a display 14, which is a conventional cathode-ray tube screen, for the display of the input text, as modified according to the operational signals.

Figure 2:
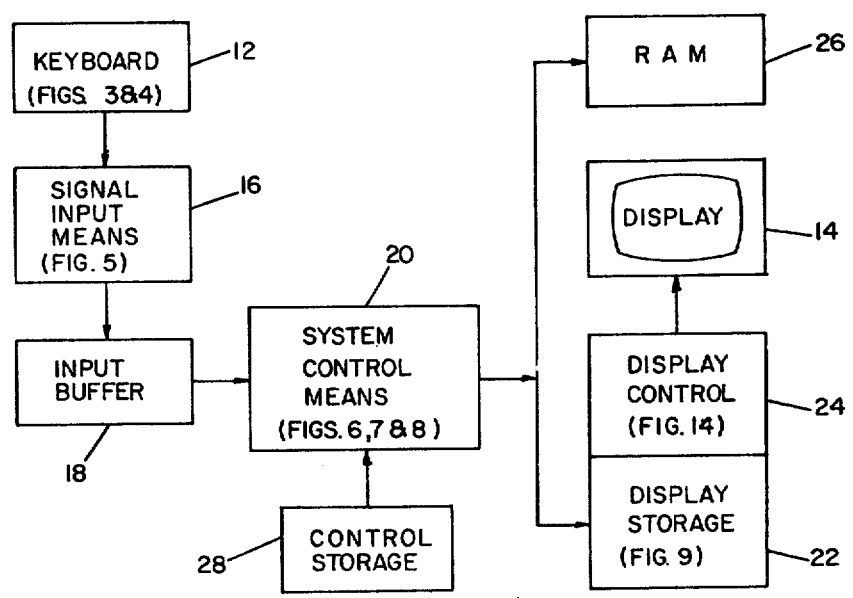
FIG. 2 is a diagrammatic view of the internal structure of such a system.

Referring now to FIG. 2, the internal structure of the text-editing system is shown in diagrammatic form. Generally, key-specific signals representing text and text-modifying operations are input from keyboard 12, which is coupled to signal input means 16, to an input buffer 18, and from buffer 18 to the system control means 20. System control means 20 decodes the input signals, and in response to the decoded values controls the storage of text in random access memory 26. Also in response to the decoded values, system control means 20 controls the storage of signals in display storage 22. The contents of display storage 22 are applied to display control circuit 24, which controls the display 14. In response to input text-modifying operation signals, system control means 20 accesses groups of instructions stored in control storage 28, and operates in accordance with such instructions to edit the stored and displayed text.

Text-editing systems of this general kind are well known. A printer may be connected on-line to the system, or alternatively, the edited text may be stored on a medium such as a magnetic tape or disk which may be physically transferred to the control system of a printer, a telecommunications system, or the like, all in a manner forming no part of the present invention.

The particular system described herein is of the type known as "document-oriented" (as contrasted with "page-oriented" systems, for example). Text is considered to be divided into "documents" of arbitrary length. A document may comprise, for example, a short letter of less than a typewritten page, or may comprise a treatise of many pages, limited only by the total available text storage. By means not relevant to the present invention, when the operator initiates the input of a document, the system control means automatically assigns a "document number" to the document, displaying such number on the display, and stores the number in an internal index together with the address of the portion of text storage at which the text identified by that document number is stored. The system user at any time thereafter can input the document number together with appropriate instructions, which (by means not relevant to the present invention) will cause the system to print the document, to delete it, or to display it, a screenload at a time, for the purpose of editing operations.

Figures 3, 4:
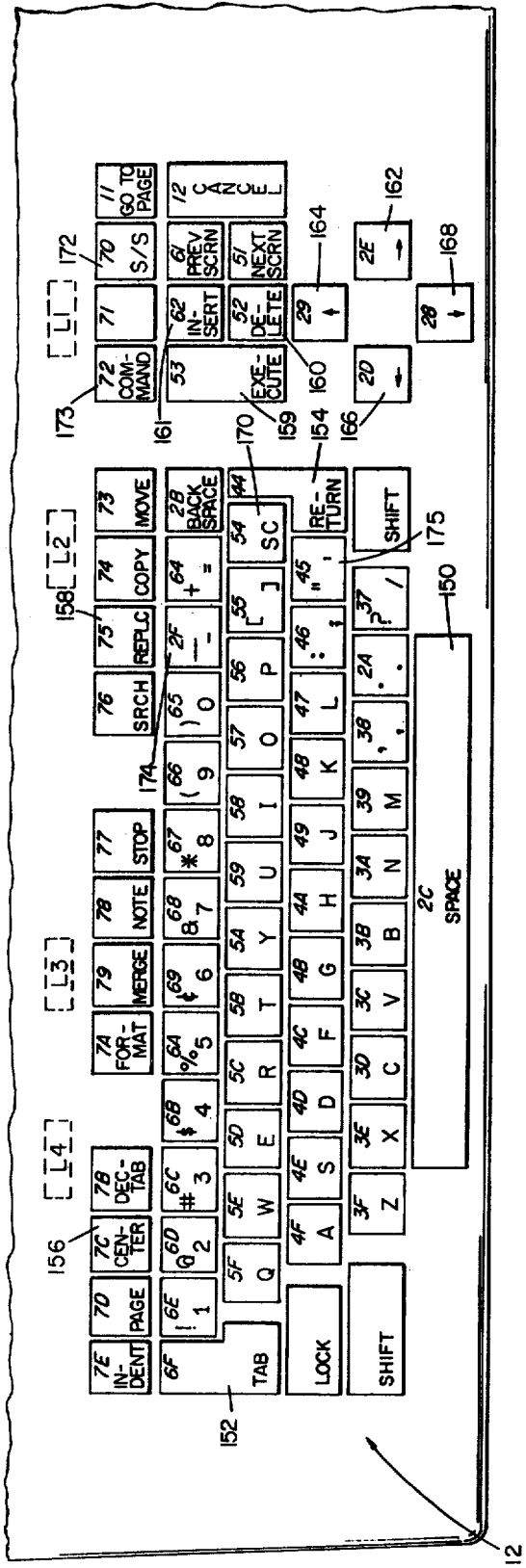
FIG. 3 is a view of the upper surface of the keyboard of FIG. 1, showing the key symbols and the signals input by the keys.
FIG. 4 is a view of the lower surface of the keyboard, showing the switching connections for each key.
Figure 5:
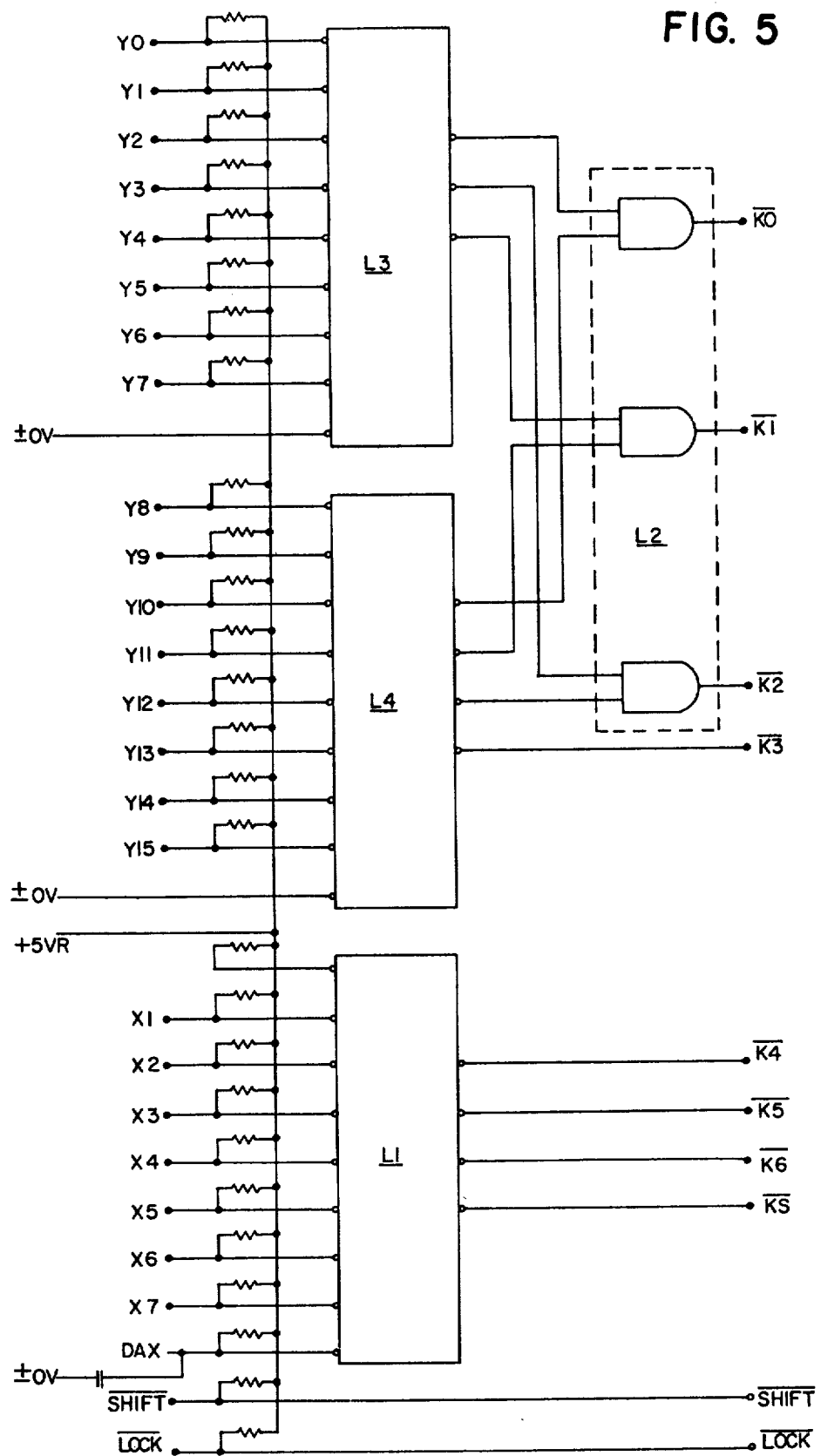
FIG. 5 shows the signal input means of the system.

FIGS. 3, 4 and 5 show the structure associated with the generation of key-specific signals. Referring first to FIG. 3, keyboard 14 provides a plurality of keys, including conventional alpha-numeric character keys for inputting signals corresponding to characters (such as a, b, c, or 1, 2, 3), and additional operational keys. The operational keys include keys for inputting signals representing conventional typewriter operations such as "space" (key 150), "tab" (key 152), or "return" (key 154), as well as additional keys for inputting signals representing editing operations commonly employed in text-editing systems, such as "center" (key 156), "replace" (key 158), "delete" (key 160), and the like. The typewriter operations and the operations characteristic of text-editing systems are here classed together as "text-modifying operations".

Among the operational keys are four keys which move the "cursor" (position indicator) graphic on the display, called "cursor east" (key 162), "cursor north" (key 164), "cursor west" (key 166) and "cursor south" (key 168). The cursor will be discussed further in what follows. Also among the operation keys is the "execute" key 159, which indicates the end of an input string of keystrokes. The aspect of the function of this key that relates to the present invention will be described in what follows. In addition, keyboard 12 provides a "command" key 173, a "special condition" key 170 (S.C.) and a "select/store" key 172 (S/S) whose functions will be explained in what follows.

Each key, when actuated, closes switch contacts which are coupled to signal input means 16 to generate a key-specific input signal. The shift and lock keys generate a separate input. Signals representative of upper case letters or symbols are generated by actuating the shift key followed by the letter or symbol key.

FIG. 4 shows the particular switching connections that are made by depressing each key shown in FIG. 3. Signal input means 16 responds to the switching connections as shown in FIG. 5 to provide a representation of the key as a combination of the inputs K0–K6, together with a keyboard strobe signal KS, and shift and lock inputs, which generate the eighth bit (K7) of the representation. Each key-specific input is shown in association with its key in FIG. 3, and is referred to as the "external" representation of the key.

Referring now to FIG. 6, portions of the structure of the system shown diagrammatically in FIG. 2 are shown in more detail, in particular, the system control means 20 and the RAM 26.

System control means 20 includes a timing circuit 40 and row and column counters, shown in FIG. 6 as block 36, and shown in more detail in FIG. 10. The operations of the entire system, including the system control means 20, are timed by signals from timing circuit 40 (FIG. 10), which are employed to clock signals through the buffers, registers and other circuit elements in a manner that is well known in the art and forms no part of the invention. The outputs of the row and column counters are used in controlling the display. The principal timing signals employed, and their relationship to one another, are shown in the timing diagram of FIG. 11. The particular timing inputs to the circuitry of the system have been omitted in the figures, except in connection with the generation of the display.

Referring now again to FIG. 6, the K0-K7 inputs ("external" representation) from signal input means 16 are applied to block 30, containing an external to internal representation conversion table. The "external" representation, in two bytes (high and low order) each comprising four binary elements is applied to address the table, and an internal representation is read out. The internal representation also comprises two bytes, each of four binary elements.

Figure 15:
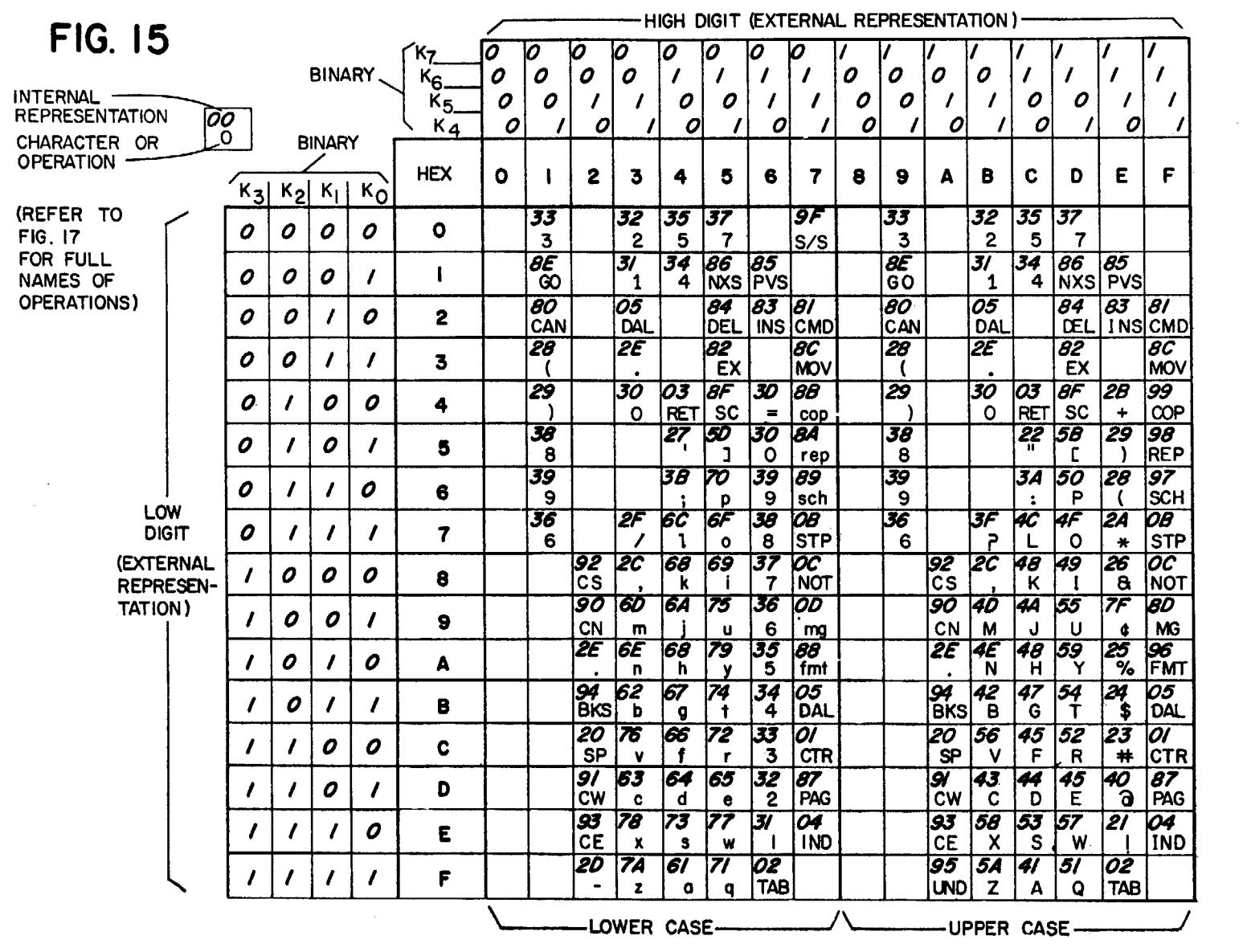

Referring now to FIGS. 15, 16, and 17, FIG. 15 shows in tabular form the contents of block 30 of FIG. 6. The external representation bytes are used to locate the square containing either the alpha-numeric character or an abbreviation of the text-modifying operation, together with the two-byte internal representation, in hexidecimal form. The names of the operations are abbreviated for reasons of space in the figure.

Referring next to FIG. 16, the internal representations are shown in both binary and hexidecimal form, with the corresponding alpha-numeric characters and abbreviated names of operations. In FIG. 17, the abbreviated names of text-modifying operations are shown (in column II of the Figure). The full name of the operation is given in column IV of FIG. 17. Certain of the operations (e.g. "replace") appear twice, once designated "L.C." and once designated "U.C." The two forms represent different operations, whose particular features are not relevant to the present invention. The designation "L.C." (lower case) means that the appropriate key was actuated without the shift key, whereas "U.C." (upper case) means that the shift key was actuated. As has been explained, the shift key inputs a separate signal which is combined with the operation key signals to form the external representation of the operation.

The internal representation of each operation is given in either colum I or column III of FIG. 17, corresponding to operations have displayable graphics and operations not having such graphics. As is seen from the Figure, representations having a high-order byte running from 0 to 7 (bit 7=0) have an associated displayable graphic, while representations having a high byte of 8 or 9 (bit 7=1) have no displayable graphic. Thus, for example, when the text-modifying operation key 156 ("center") is actuated (internal representation hexidecimal "01"), the "center" graphic is displayed, and at the same time the centering operation is carried out, by means to be described. When a non-displayable text-modifying operation signal (e.g. GO TO, internal representation hexidecimal "8E") is input, no graphic is displayed, although the operation is carried out.

The relevance of the content of column V of FIG. 17 will be explained in what follows.

Referring now again to FIG. 6, the internal representation read out from block 30 is stored in input buffer 18, while the KS (keyboard strobe) signal is input (together with a timing signal, not shown) to interrupt circuit 32, which in a known manner generates an interrupt signal which is input on line 34 to system control means 20.

Still referring to FIG. 6, the system control means 20 comprises a decoding circuit 42 which is connected to the eight bit bidirectional data bus 46. In addition, decoding circuit 42 is connected to the address generator and read/write control circuit 48, which is coupled to a sixteen bit address bus 50. Decoding circuit 42, which is seen in more detail in FIG. 7, decodes the internal representations of the key-specific input signals and in response thereto generates internal control signals for the operation of the system, as will be explained in more detail in what follows.

System control means 20 further comprises a processor 52, which is coupled to the control storage 28. When signals representative of text-modifying operations are input to decoding circuit 42, the internal control signals that are derived in response thereto control the address bus to address control storage 28, and give control to the processor 52. Processor 52 thereafter operates according to stored groups of instructions from control storage 28 to carry out the operation specified by the input signals. Processor 52 controls the data bus and the address generator and read/write control circuit 48 to alter the content of RAM 26 and of display storage 22 in accordance with such operations. The structure of the processor and the details of the instructions stored in control storage 28 are a matter of design choice and form no part of the present invention.

Among the operations performed by processor 52, in a known manner, is the "underscore" operation, in response to actuation of key 174, in combination with the shift key. In response to the internal representation (1001 0101) of the underscore key, appropriate instructions in control storage 28 are addressed and executed by processor 52 to address RAM 26 and display storage 22 at the location indicated by the current cursor position. If the internal representation stored at that location has a configuration having a numerical value greater than 0000 1111, and less than 1000 0000, the processor controls the read/write control means to write "1" into the eighth bit of the two-byte location. Referring to FIG. 16, it is seen that a configuration meeting these criteria is a representation of a character. All others are representations of operations, some of which have associated display graphics. Therefore, no display graphic can be underscored. As will be seen in connection with the more detailed description of the internal representations, a character that can be underscored is specified by the first seven bits (including upper or lower case) of the eight-bit representation; the eighth bit represents presence (1) or absence (0) of the underscore. The relevance of the underscore will appear in what follows.

Random-access memory 26 is coupled to data bus 46, and is addressed by address bus 50. RAM 26 includes a specific region designated "document storage" 54, which is that portion of RAM 26 in which text is stored, organized as "documents".

The CRT display 14 (FIG. 2) displays the content of display storage 22, which at any one time holds one screen-load of the material stored in document storage 54. The display is organized in eighty columns (horizontal positions) and twenty four rows (vertical positions). The display is generated by a conventional raster scan; a row comprises eleven horizontal scan lines. Each display graphic (character or other symbol) is made up of a pattern of selected dots in an eight by eight dot matrix. In addition to the eight scan lines of a character, two further scan lines are used to display a "cursor" symbol beneath the character, when required, and the eleventh line is blanked for spacing between rows. Sync and blanking signals for controlling the raster scan are derived from the column and row counts, which in turn are derived from one of the basic system timing signals, as shown in FIG. 10. The sync and blanking signals are seen in the timing diagrams of FIGS. 12 and 13.

The sync and blanking signals are combined with a video signal (obtained in a manner to be described) from a video shift register (FIG. 14) and applied to the input to the CRT to produce the desired visual display in a known manner. The generation of the display will be described in more detail in what follows.

As claimed in our application Ser. No. 959,704, filed Nov. 13, 1978, and assigned to the same assignee as the present application, the text editing system includes additional structure which provides the system with the flexible capability of storing sequences of characters and/or operations for recall and use in editing other material at a later time, permitting repetitive use of such sequences. The invention of application Ser. No. 959,704 has two aspects, corresponding to the different problems of handling text and operational input.

In a first aspect, the additional structure comprises a select/store (S/S) key 172 on keyboard 12, by which the system user initiates selection and storage of a sequence of characters and/or operations for later recall. The additional structure further comprises select/store means responsive to key 172 and to a first condition of one portion of the internal representation of an input signal for selecting and storing such signal, while bypassing signals having a second condition of such portion. The two alternative conditions are recognized by the display control to display the input signals in either of two visually distinct modes, permitting the user to enter and view as part of the sequence comments as well as inputs intended for later recall.

In a second aspect, the additional structure of the system claimed in our application Ser. No. 954,704 provides means for inputting key-specific signals corresponding to text-modifying operations in association with a special input condition signal, and means for providing a special input condition representation of such signals in accordance with the special input condition signal, the special input condition form being displayable. The select/store means is responsive to actuation of the select/store key 172 for selecting and storing signals representing the text-modifying operations.

Finally, the additional structure comprises means for recalling a stored sequence for use in controlling the system.

According to the present improvement, a keyboard interactive operation signal is stored as part of the sequence. The system responds to retrieval of this signal to permit keyboard input, after which the recall of the stored sequence is automatically resumed.

The additional structure of the present invention comprises means for inputting a signal corresponding to the keyboard interactive operation, means for providing a displayable special input condition representation of such signal, and a saved-address register coupled to the system addressing means. During recall of a stored selected sequence that includes the internal representation of the keyboard interactive operation, an interactive operation means in the system control means responds to such representation by saving in the saved-address register the address from which the next stored representation would be retrieved, and enabling the keyboard interrupt for the input of signals from the keyboard until the "execute" (string end indicator) key is actuated. The interactive operation means responds to the string end indicator to disable the keyboard interrupt and to restore the saved address, for the continuation of operation according to the stored selected sequence.

Referring again to FIG. 6, the system control means 20 comprises a select/store circuit 44 for selecting and storing sequences for later recall and execution. The operation of this circuit will be described in more detail in connection with FIG. 8.

Further, RAM 26 includes, in addition to document storage 54, a special condition storage 56 for storing sequences intended for later recall and execution, and an index of special condition storage 56.

In addition, the system provides a read-only storage block 60 called the "key-name table", which is coupled to data bus 46, and is addressable by address bus 50. The contents of the key-name table are shown in tabular form in FIG. 17.

Column V of FIG. 17 lists the "key-name" of each key. The "key-name" is the special input condition representation of the key. The format shown, in which a sequence of upper-case letters are enclosed between two hyphens and then between two parentheses, is a part of the key-name. When storage block 60 is addressed by the internal representation of the key (columns I and III), the corresponding key-name is read out from column V. A single (two-byte) internal representation of an operational key is thereby replaced by a sequence of internal represenations of a plurality of upper case characters, enclosed between hyphens and parentheses. All of the elements making up a "key-name" are displayable. The purpose of the key-name table will be explained in what follows.

According to the present invention, an additional read-only storage block 61 is provided, called the "command table", which is also coupled to data bus 46 and is addressable by address bus 50. The portion of the contents of block 61 that is relevant to the present invention is shown in FIG. 20. As is seen in FIG. 20, when block 61 is addressed by the internal representation 0010 0010 (hexidecimal "22"), the displayable "key-name" (-N-KEYS-) is read out. By referring to FIG. 16, it is seen that the internal representation 0010 0010 is input from the keyboard by actuating the quotation mark key 175. (-N-KEYS-) is the special input condition representation of the keyboard interactive operation. However, when the block 61 is addressed by the representations of the key-name (-N-KEYS-), the internal representation 1011 0001 (hexidecimal "B1") is read out. By referring to FIG. 16, it will be seen that this representation is not input by actuating any of the keys on keyboard 12. The application of these elements to the keyboard interactive operation will be explained in what follows.

Figure 7A:
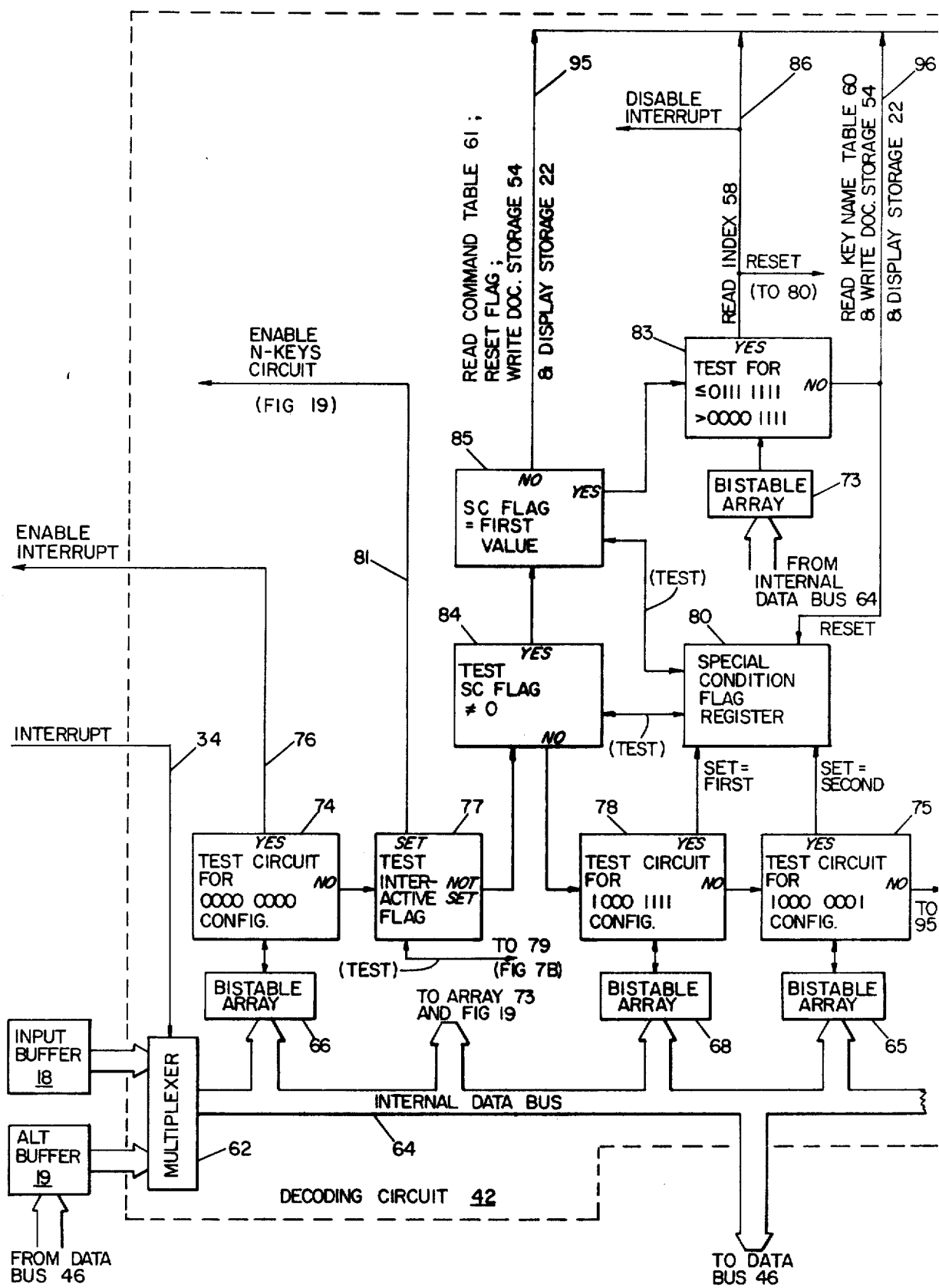
FIGS. 7A and 7B are a more detailed showing of the decoding circuit of FIG. 6.
Figure 7B:
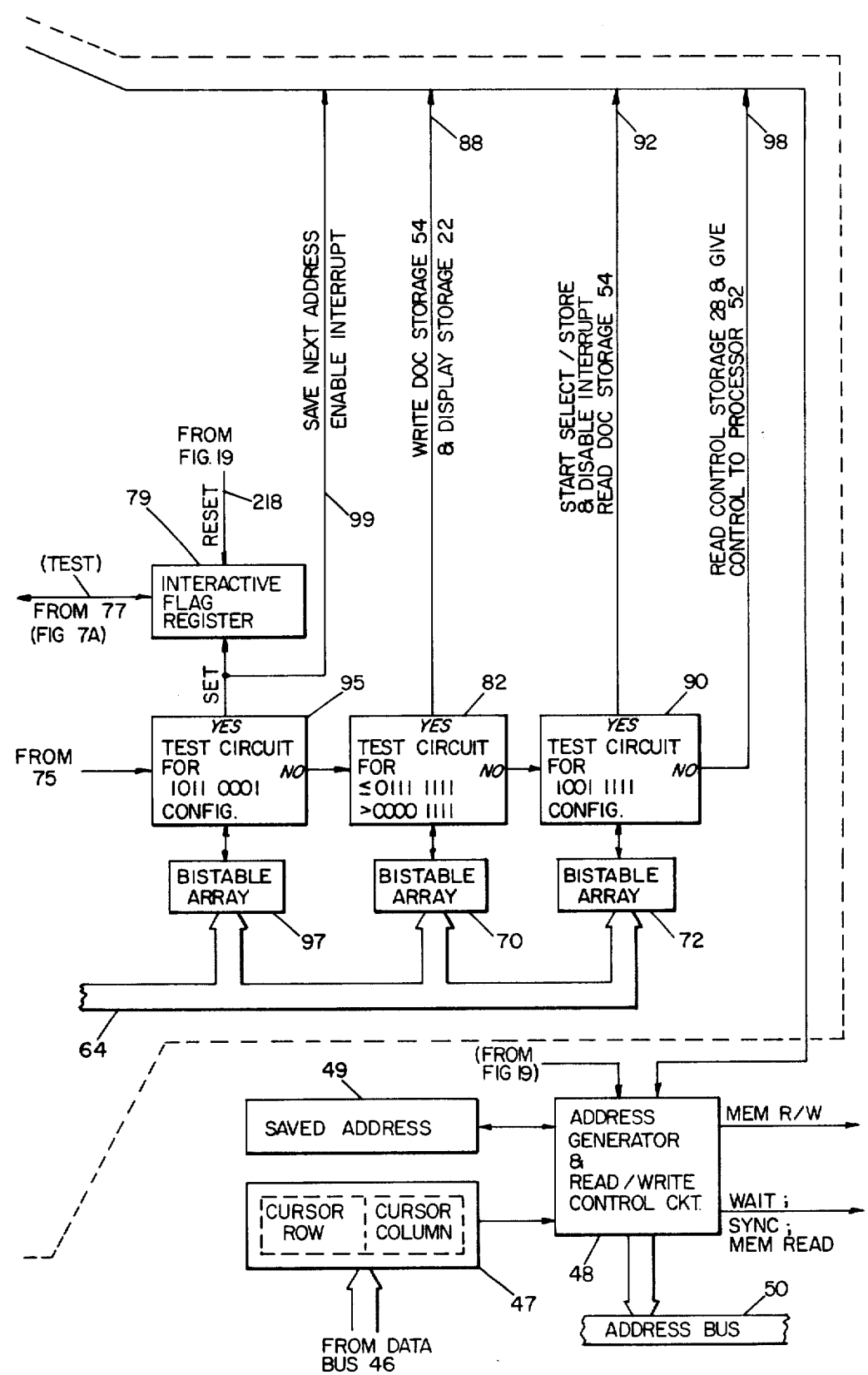

Referring now to FIGS. 7A and 7B, decoding circuit 42 is shown in more detail. Essentially, this circuit comprises an internal data bus for applying the internal representation of an input signal to set the states of a sequence of arrays, each comprising a sequence of bistable elements, and a sequence of test circuits for testing the configuration of each array after the elements have been set. Two flag registers are provided, for the special condition flag and the interactive flag; the flags are set and reset in response to certain of the tests, and the states of the flags are combined with the outputs of the test circuits to derive internal control signals for the system.

More in detail, the contents of input buffer 18 are applied to a multiplexer 62, which is switched by the interrupt signal 34. The contents of buffer 18 are multiplexed with the contents of an alternate buffer 19, which is employed during the process of recalling stored selected signals, as will be explained in what follows. The multiplexer gates the input signals onto an eight-bit internal data bus 64, which applies the signals to each of seven arrays, each comprising eight two-state elements. Each element of an array is set to one of the two states in accordance with the input signals, and the resulting configuration is tested by a test circuit.

First, the configuration of arry 66 is tested by circuit 74, which tests for the configuration in which all the elements of the array are in the "0" state. The purpose of this test, which is related to the recall of stored sequences, will become apparent in what follows. If the test is positive, an "enable" control signal 76 is output to interrupt circuit 32 (FIG. 6), to enable the input of further signals from keyboard 12. If the result of this test is negative, test circuit 77 is enabled, to test the condition of the interactive flag in register 79; the purpose of this test, which is related to the keyboard interactive feature of the invention, and the manner in which the interactive flag is set, will be explained in what follows. If the result of this test is positive (the interactive flag is found to have been set), the keyboard interrupt is enabled, and the "N-Keys" circuit of FIG. 19, to be described, is also enabled. If the result is negative (the interactive flag has not been set), test circuit 84 is enabled, which tests the condition of the special condition flag in register 80.

The special condition flag in register 80, as will be explained, may be set to either of two non-zero values, or may be zero (not set). The flag is set to the first value in response to actuation of special condition key 170 on keyboard 12; the flag is set to the second value in response to actuation of command key 173. The manner in which the special condition flag is set, and its purpose, will be described in what follows. Test circuit 84 tests for the non-zero condition of the special condition flag.

If the special condition flag is non-zero, a further test is performed by test circuit 85, which tests for the first non-zero value of the flag. If the result of the test is negative (the flag has the second non-zero value, indicating previous actuation of the command key 173), internal control signal 95 is output to apply the internal representation on internal data bus 64 to the address generator and read/write control circuit 48, to address the command table of block 61 (FIG. 6).

The command table of block 61 contains the special condition representations (key names) of a number of special operations, forming no part of the present invention, with the exception of the keyboard interactive operation. Signals initiating each of these special operations are input into the system by actuation of command key 173 followed by actuation of one of the other keys, arbitrarily assigned for this purpose, on keyboard 12. A large number of possible special operations may thus be input, without the provision of additional dedicated keys. However, the system may also be designed with a dedicated key to input each special operation, including the keyboard interactive operation that is the subject of the present invention. The particular manner of inputting the keyboard interactive operation signal forms no part of the present invention.

For purposes of the present invention, only one portion of the contents of block 61 is relevant, as will be described. Internal control signal 95 from test circuit 85 causes the addressed element of block 61 (the key-name (-N-KEYS-)) to be written into document storage 54 and display storage 22.

The next internal representation is then applied to decoder 42.

Returning to test circuit 85 of FIG. 7, if the result of the test performed by circuit 85 is positive (the special condition flag has the first non-zero value, indicating previous actuation of the special condition key 170), a signal is output to enable test circuit 83, which tests the configuration of bistable array 73 to determine whether it is numerically less than or equal to 0111 1111 and greater than 0000 1111. By reference to FIG. 16 it is seen that if the result of this test is positive, the representation is that of a test character (which may be a digit), while if the result is negative, the representation is that of a text-modifying operational key. The significance of this test, and the resulting internal control signals, will be described in more detail in what follows.

Returning to test circuit 84, if the special condition flag has a value of zero (has not been set), the next test circuit 78 is enabled.

Test circuit 78 tests the configuration of the elements in array 678 for the configuration "1000 1111" (hexidecimal value "8F"). By reference to FIG. 16 it is seen that this is the internal representation of the "S.C." (for "special condition") key on keyboard 12. If the result of this test is positive, a SET=FIRST signal is output to special condition flag register 80, to set the special condition flag to the first non-zero value. The first non-zero value of the special condition flag is employed in connection with the input of key-specific signals corresponding to text-modifying operations intended for later recall, and in connection with the recall of stored sequences, as will become apparent in what follows.

If circuit 78 does not find the configuration "1000 1111" in array 68, the next test circuit 75 is enabled. This circuit tests the configuration in array 65 for the configuration "1000 0001" (hexidecimal value 81). By reference to FIG. 16 it is seen that this is the internal representation of the "Command" key 173 on keyboard 12. If the result of this test is positive, a SET=SECOND signal is output to special condition flag register 80, to set the special condition flag to the second non-zero value. The second non-zero value of the special condition key is employed in connection with the keyboard interactive feature of the present invention, as will be described.

If circuit 75 does not find the configuration "1000 0001" in array 65, the next test circuit 95 is enabled. This circuit tests the configuration of the elements in array 97 for the configuration "1011 0001" (hexidecimal value "B1"). This is the internal representation of the keyboard interactive operation (N-keys). By reference to FIG. 16 it will be seen that this representation is not input through the keyboard. In fact, this representation is read out from the command table of block 61, as has been explained.

If the result of the test performed by test circuit 75 is positive (the configuration hexidecimal "B1" is found) a SET signal is output to the interactive flag register 79, to set the interactive flag. In addition, internal control signal 99 is output to circuit 48, to cause the address generator to save the next address in the Saved Address register 49, and interrupt circuit 32 is enabled.

If the "B1" configuration is not found in array 97 (the representation on internal data bus 64 is not that of the N-keys operation), the next test circuit 82 is enabled. This circuit tests the configuration in array 70 to determine whether it is numerically less than or equal to 0111 1111 and greater than 0000 1111. By reference to FIG. 16 it is seen that if the result of this test is positive, the representation on data bus 64 is that of a text character (which may be a digit), while if the result is negative, the representation is that of a text-modifying operation key. If the result is positive, a control signal 88 is output to address generator and read/write control circuit 48 to cause the character representation to be written into document storage 54 and display storage 22. If the result is negative, the last test circuit 90 is enabled. Circuit 90 tests the content of array 72 for the configuration 1001 1111 representing a "select/store" command, input from key 172 on keyboard 12.

Figure 8:
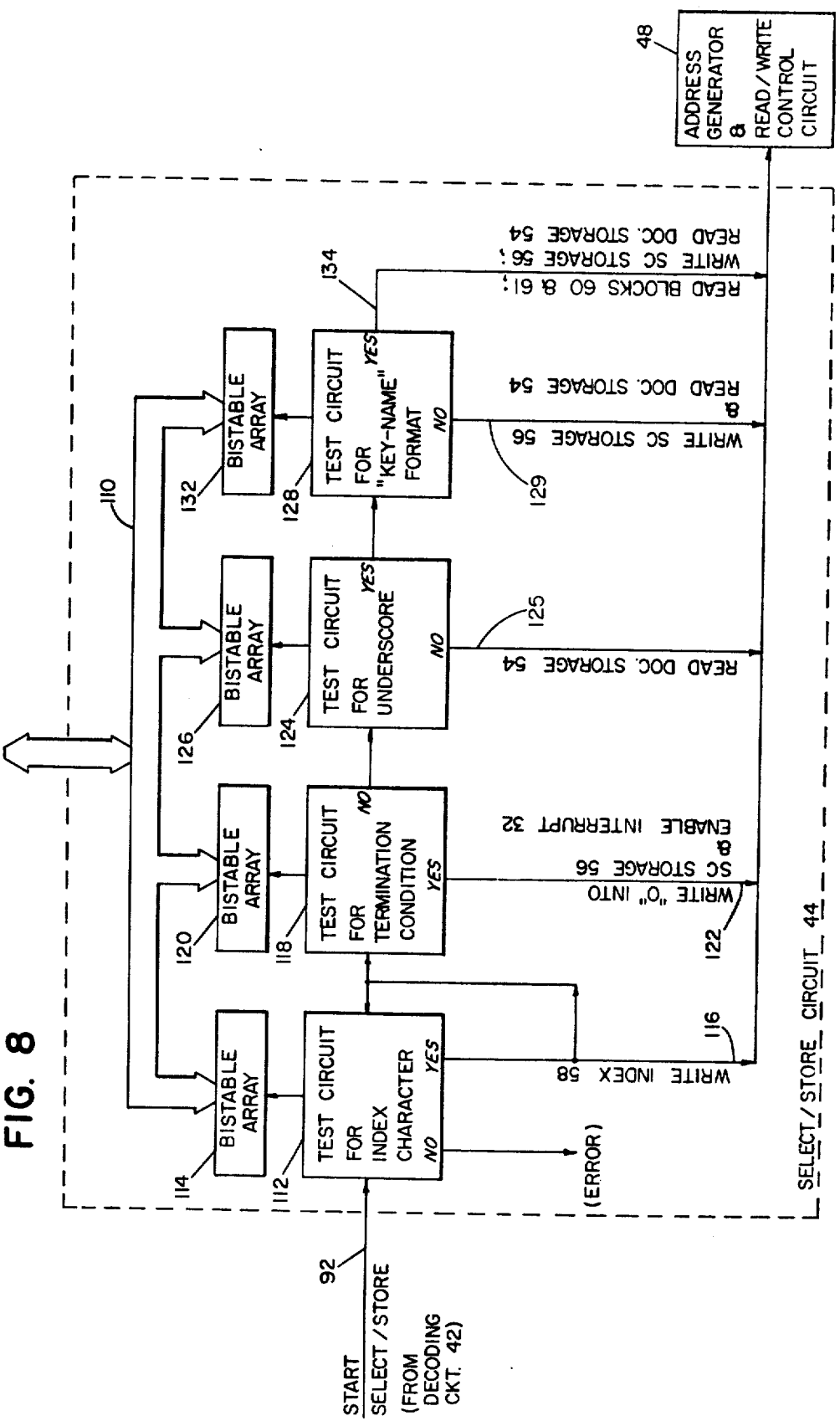
FIG. 8 is a more detailed showing of the select/store circuit of FIG. 6.

If the result of the test performed by circuit 90 is positive, a "select/store" command has been input by the system user by actuation of select/store key 172 on keyboard 12; an internal control signal 92 is output, to control the address generator and read/write control circuit 48 to read document storage 54 in RAM 26 at a location corresponding to the current document number, in order to select and store a sequence, as will be explained in more detail. This control signal, in addition, disables interrupt circuit 32, and is input to select/store circuit 44 (FIG. 8). If the result of the test is negative, a text-modifying operation key has been actuated by the system user. A signal is output at 98 to control the address control means and read/write means to read control storage 28, and to give control to processor 52. The appropriate instructions will be accessed, and processor 52 will operate in accordance therewith to carry out the text-modifying operation specified by the input signal.

The various internal control signals output by the test circuits of decoding circuit 42 are input to address generator and read/write control circuit 48.

In addition, the current row and column positions of the "cursor" graphic (position indicator) on display 14 are stored in block 47, and signals representative of these positions are input to the address generator. The cursor position may be changed directly by the user by actuation of the cursor move keys 162, 164, 166 and 168 (FIG. 3); the cursor position is also updated by the system control means, in a manner not relevant to the present invention, upon actuation of any other key affecting the display. For example, upon the entry of a text character, the cursor is moved to the next display position; upon actuation of the return key, the cursor is moved to the first column in the next row of the display. Circuit 48 is also connected to a "Saved Address" register 49, into which the next address that would normally be output is stored in response to internal control signal 99 from test circuit 95.

Figure 9:
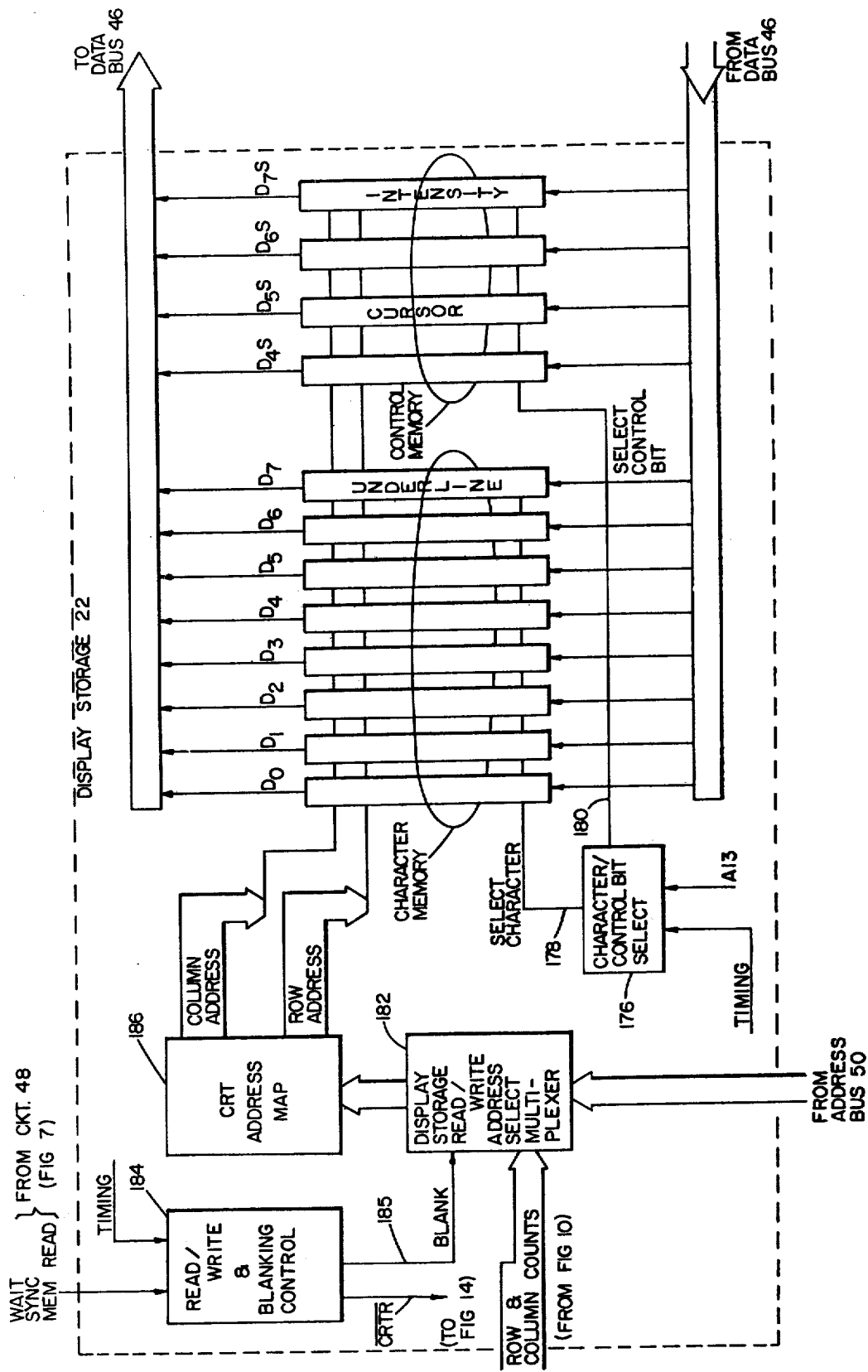
FIG. 9 shows the display storage of FIG. 2 in greater detail.

The address generator, in a manner well known in the art, with reference to the current cursor row and column positions generates appropriate address signals and applies them to address bus 50 to address RAM 26, control storage 28, display storage 22, "key-name" table 60 or command table 61. Address bits A12–A14 are applied to chip select decode circuit 102 (FIG. 6), which derives therefrom chip enable signals which are applied in a known manner to RAM 26 and blocks 60 and 61 to select particular portions thereof. Circuit 48 further outputs appropriate read/write control signals including "MEM R/W", which is applied (together with timing signals, not shown) to read/write strobe circuit 100 (FIG. 6) to generate strobe signals, which control read/write operations on RAM 26, control storage 28, and blocks 60 and 61. Control signals "WAIT", "SYNC", and "MEM READ" are applied to display storage 22 (FIG. 9).

Referring now particularly to FIG. 8, select/store circuit 44 essentially comprises an internal data bus 110 connected to system data bus 46, for applying the internal representation of a key-specific signal to set the states of a sequence of arrays of bistable elements, and a sequence of test circuits for testing the configuration of each array after the elements have been set. (Although for simplicity of the drawing single arrays have been shown, certain of the tests in fact require two or more representations to be successively tested). Internal control signals are derived as the result of the tests. During a select/store operation, the representations being applied to circuit 44 are not applied to the display.

A start select/store signal 92 from test circuit 90 in decoding circuit 42 enables the first test circuit 112, which tests the configuration of elements in array 114. This circuit tests only the first internal representation to be applied to select/store circuit 44, which must be in a form to be recognized as an "index character". In the present embodiment, the recognizable form has been defined as a single text character, enclosed between parentheses, in the first three positions in the document (that is, nothing appears before them, even a space). Therefore the first three characters must be sequentially tested by circuit 112 to determine whether an index character is present. If the first three characters do not conform to the required form, an error signal is output. (Error signals result in an alarm and/or a displayed prompt to the user; the specific error signal forms no part of the present invention.) If the first three characters do conform to the requirement, circuit 112 outputs an internal control signal 116 which controls the address control means and read/write control means to write the enclosed index character into the index of special condition storage 58 in RAM 26, together with the address of the portion of special conditon storage 56 at which the subsequently selected string of text will be stored.

Control signal 116 is applied to circuit 112 to disable this circuit, and is applied to the next test circuit 118 to enable it. Circuit 118 tests the configuration of the elements in array 120, set by the next succeeding internal representation from document storage, for a configuration corresponding to a "termination condition". This may be the successively input signals corresponding to the cancel and execute keys, or it may be other suitably chosen signals.

If a termination condition is detected, circuit 118 outputs internal control signal 122, which controls the address control and read/write control means to write the (hexidecimal) character "00" into the special condition storage 56, and to enable interrupt circuit 32. If the termination condition is not detected, a signal is applied to enable the next test circuit 124, which tests the condition of the eighth bit of the array 126. If the eighth bit is "on", representing an underscored character, a signal is output to enable the final test circuit 128. However, if the eighth bit is "off", an internal control signal 130 is output to control the address and read/write storage means to read the next stored internal represenation out of document storage 54 in RAM 26. Thus, in effect, a character which is not underscored is bypassed by the circuit.

The final test circuit 128 tests the configuration of array 132 for the "key-name" format. This circuit consists of a sequence of two test circuits, not shown in detail, to detect the presence of a left parenthesis and a hyphen, retrieved in sequence from document storage 54. If both are found, the succeeding stored internal representations (comprising the "key-name") are read out of document storage 54, and internal control signal 134 is output, to control address and read/write control means to apply the "key-name" to address the contents of block 60, or, when the representation is (-N-KEYS-), block 61 (FIG. 6), to read out of block 60 or 61 the single internal representation of the corresponding operation, and to store it into special condition storage 56.

Referring now to FIG. 19, the keyboard interactive operation ("N-KEYS") circuit comprises two additional test circuits, which test the configuration of two bistable arrays, set by the representation on the decoder internal data bus 64 of FIG. 7. Circuit 214 is enabled by internal control signal 81 from test circuit 77 (FIG. 7A) when the interactive flag in register 79 (FIG. 7B) is found to be set. Circuit 214 tests the configuration in array 212 for a numerical value of less than 1000 0000. Referring to FIG. 18, it is seen that this test excludes representations of text-modifying operations not having displayable graphics.

If the result of the test is positive (a displayable character or operation has been entered) internal control signal 215 is derived, to cause the address and read/write means of the system to write the character or graphic representation into document storage 54 and display storage 22. If the result is negative, test circuit 216 is enabled, to test the configuration of array 210 for 1000 0010, the internal representation of the execute key 159. If the result is negative, an error signal is output. If the execute key (string end indicator) has been actuated, internal control signal 218 is derived, which disables interrupt circuit 32 (FIG. 6), restores the address saved in register 49 (FIG. 7B), and resets the interactive flag in register 79 (FIG. 7B).

CONTROL OF DISPLAY

Referring now particularly to FIGS. 9 through 14, the control of display 14 to display the contents of display storage 22 will be described, for the sake of complete understanding of the operation of the invention. However, the control of the display is accomplished in a manner that is in general known, and the details form no part of the present invention.

In brief summary, as has been described, the display on screen 14 is divided into a matrix of row and column positions. Each position may be occupied by a display graphic or may be blank. There are 24 rows (vertical positions) and 80 columns (horizontal positions); thus, there are a total of 1920 positions on the screen. The matrix of display positions is mapped onto the character memory of display storage 22 (FIG. 9).

Each possible display graphic is composed of a pattern of dots in an eight by eight dot matrix. A binary representation corresponding to a particular display graphic (or the absence of a graphic) is stored at each position in the character memory corresponding to a display position on screen 14. To generate the display, this representation is read out and applied to address a "character generator", which contains the information for generating the eight by eight dot matrix of each display graphic. The dot patterns are read out from the character generator and are used to control the illumination of CRT display 14 in a known manner.

It will be appreciated that the content of the character memory of display storage 22 is necessarily constantly changing as new text is input, or as text-modifying operations are carried out, or as previously stored material is recalled from document storage 54 in RAM 26 for further editing. Consequently, the pattern of display 14 is likewise constantly changing.

Referring now to FIG. 9, information as to which graphic symbol is to be displayed in each of the symbol positions of the screen is stored in the character memory of the display storage 22, which is a random access memory. The information needed to control the display of a character comprises twelve bits in all. Of these, eight bits (D0 - D7) comprise the internal representation of the character code, and four bits are control bits. Two control bits control the intensity (high or low) of the character and presence or absence of the cursor. The others have functions not relevant to the present invention. Since the data bus is only 8 bits wide, the control bits must be addressed separately. Therefore the character codes are stored in 8K of storage having addresses 56K through 64, called the "character memory", and the related control codes are stored in 8K of storage having addresses 48K to 56K. called the "control memory".

The CRT character memory (in display storage 22) is organized as "partially loaded addresses". That is, the portion of the sixteen bit address (the three high order bits) that specifies character memory rather than control memory is preassigned. The high address byte is used as a CRT row value (1 to 32); the low byte is used as a column value (1 to 80). As 8K is allocated for the CRT memory, this will allow a maximum of 32 rows, each row containing 256 characters. However, only 24 rows are used, with 80 columns in each. The address has the form:

high byte      low byte
111X XXXX      YYYY YYYY
where XXXXX=row address, 0 through 23, and YYYY YYYY=column address, 0 through 79. Bits A13, A14 and A15 are all "1".

The control memory is also organized as "partially loaded addresses". The high address byte points to the control bits of the CRT rows while the low address byte points to the control bits of the CRT columns. The address has the form:

high byte      low byte
110X XXXX      YYYY YYYY
where

X XXXX = row address 0 through 23, YYYY YYYY = column address 0 through 79. Bits A14 and A15 are "1"; bit A13 is "0".

The value of address bit A13 therefore determines whether a character bit or control bit is addressed.

The WAIT, SYNC and MEM READ signals from Address Generator and Read/Write Control circuit 48 (FIG. 7) are input with a timing signal to Read/Write and Blanking Control circuit 184. A Display Storage Read/Write Address Select Multiplexer 182 is under the control of Read/Write & Blanking Control circuit 184, which permits data to be written into (or read out of to the system control means) display storage at addresses output from system control means 20 on address bus 50, only during the vertical retrace (or vertical blanking interval) of the CRT beam. During the raster scan interval, display storage 22 is addressed by the row and column counts (from FIG. 10) to read out the information stored in the memory at the appropriate times to generate the symbol display on CRT 14.

As controlled by the blanking signal 185 from circuit 184, the address on address bus 50, or the row and column count from FIG. 10, is input by multiplexer 182 to CRT address map 186, which generates column and row addresses. In addition, bit A13 of the address on bus 50 is input to Character/Control Bit Select circuit 176 (together with a timing signal). If A13 = 1, the eight character bits are addressed; if A13 = 0, the four control bits are addressed.

Figure 14:
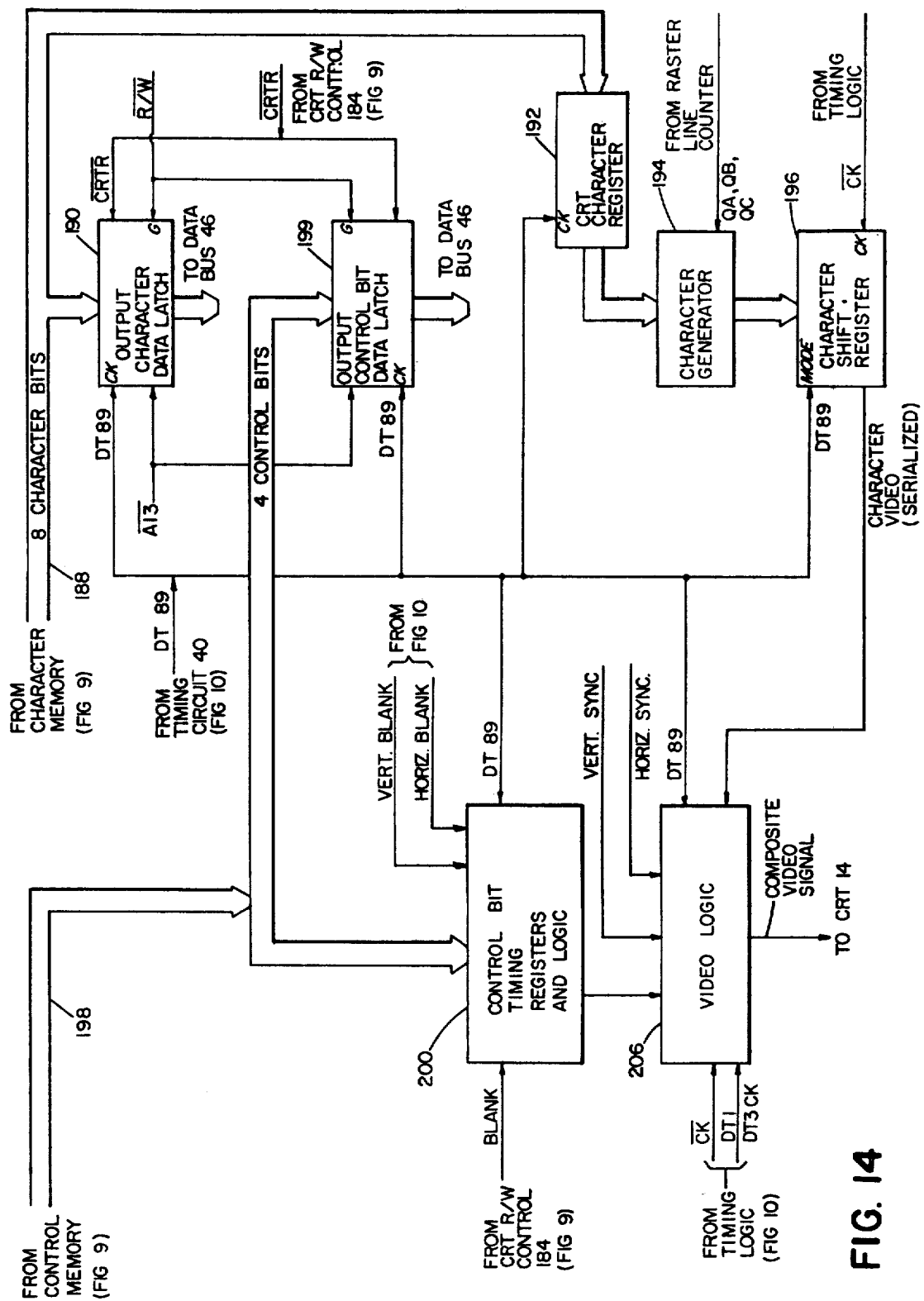
FIG. 14 is a more detailed diagrammatic showing of the display control means of FIG. 2.

Referring now to FIG. 14, if the Character Memory is addressed, the eight character bits are read out to an internal data bus 188, from which they are input to Output Character Data Latch 190 and CRT Character Register 192. From Data Latch 190 the character bits are applied to data bus 46. From Character Register 192 the character bits are applied to Character Generator 194, which stores the information corresponding to the sixty-four bits (eight by eight) required to generate each one of the character symbols on the CRT screen. The information is stored in eight-bit words, divided into thirty-two groups of eight words per group. The eight character bits address one of the character symbol groups. The eight words within each group are individually addressed by three additional bits derived from the video timing logic, which bits identify which of the eight lines of a symbol is currently being scanned across the monitor display screen. The eight-bit words stored in character generator 194, as they are addressed, are transferred out in parallel to the video shift register 196. The eight bits are then shifted out of the video register 196 serially to video logic block 206, to modulate the cathode ray beam to form the desired pattern of eight dots of one line of the selected symbol.

If the Control Memory is addressed, the control bits (cursor and intensity) are output from display storage 22 via an internal bus 198 to Output Control Bit Data Latch 199 and to Control Bit Timing Registers and Logic block 200, where they are combined with the vertical and horizontal blanking signals (from FIG. 10) and BLANK signal 185 from control block 184 (FIG. 9) and are input to the video logic circuit 206. The serialized character video from shift register 196 is also input to circuit 206, which derives a composite video signal to control the beam of the CRT in a known manner.

The set of internal representations of all graphic symbols (FIG. 18) is such that the necessary information to specify the symbol is carried in seven bits. The eighth bit of each internal representation is therefore available to carry the information "underscored" or "not underscored" as to that character. The state of the eighth bit is employed by the display control logic 24 (by addressing character generator 194) to vary the display of the graphic symbols. This is interpreted, according to the invention, to provide a mode of display of symbols intended for later recall that is visually distinct from the mode of display off symbols not intended for later recall. As has been described, according to the invention, select/store circuit 44 responds to the state of the eighth bit to cause either the selection and storage of signals representing characters and operations intended to be stored for later recall, or the bypassing of signals representing characters and operations not intended to be stored for later recall.

Therefore, the information according to which a representation is to be selected or stored is carried as the eighth bit of the character representation, rather than as additional bits associated with the character representation. (The control bits are not relevant to the select/store operation). Since the data buses, storage registers, buffers, and other elements of the modified system have been previously designed to handle representations of a characteristic size, namely eight bits, this means of carrying and responding to the mode information is advantageous. If it were necessary to add one or more additional binary digits to the character representation to code the select/store information, the representation could not be transmitted through the system during a select/store operation without either providing an additional channel for the additional information, or performing an additional operation to transmit the additional bit over the existing channels.

OPERATION

In operation, the user of the text-editing system of the invention can enter and edit text (by means of the text-modifying operations) in the conventional manner, or (according to the invention disclosed and claimed in our said application Ser. No. 959,704) can use the keys to enter text and text-modifying operational instructions in the special input mode, for later (or repetitive) retrieval and execution. According to the present invention, during such retrieval, the keyboard interactive operation ("N-Keys") can permit input from the keyboard. These modes of operation will be described, with reference to the Figures.

First, in conventional editing operation of the system, the user actuates keys on keyboard 12 to input a sequence of text characters, and to modify the sequence by means of the operational keys. If the user wishes, for example, to insert into the text he is currently editing the word "Massachusetts", he actuates the (-INSERT-) key 161 on keyboard 12. Signal input means 16, coupled to key 161, generates an external representation 0110 0010 of this key, which is applied to block 30 (FIG. 6) in order to read out the corresponding internal representation 1000 0011 into input buffer 18. An interrupt signal 34 gates this representation onto the internal data bus 64 of decoding circuit 42, where it sets the elements of bistable array 66.

Test circuit 74 does not detect an all zero condition of array 66; test circuits 77 and 84 find that neither the special condition flag nor the interactive flag has been previously set. Test circuit 78 is therefore enabled, and does not detect the 1000 1111 (special condition key) configuration in the state of array 68. Therefore the special condition flag in register 80 is not set to FIRST at this time, and test circuit 75 is enabled. The configuration 1000 0001 (Command key) is not found; therefore the S.C. flag is not set to SECOND at this time. Circuit 95 is enabled, and does not find the configuration 1011 0001 (N-keys) in array 97. Therefore the interactive flag in register 79 is not set at this time. Test circuit 82 is enabled. This circuit does not detect a configuration of array 70 corresponding to a character, and therefore test circuit 90 is enabled. The select/store command is not found; therefore internal control signal 98 is generated which is applied to address generator and read/write control circuit 48 to cause addressing of control storage 28. Appropriate instructions are accessed; processor 52 operates according to such instructions to split the text displayed on screen 14 at the point indicated by the cursor when the (-INSERT-) key is actuated, and to remove the portion of the text following the cursor, permitting the user to enter the inserted material through the keyboard.

The user next actuates character keys successively to enter internal representations of the characters

MASSACHUSETTS into buffer 18. Each character is applied to decoding circuit 42, and for each character, test circuit 82 outputs an internal control signal 88, which is applied to address generator and read/write control circuit 48 to cause the internal representation of the character to be written into document storage 54 in RAM 26. The internal representation is also written into display storage 22, and is read out and applied to address character generator 194 (FIG. 14) thereby to be displayed on screen 14.

When the entire matter to be inserted has been entered, the user actuates the (-EXECUTE-) key (string end indicator), which is decoded in circuit 42 to derive internal control signal 98, giving control to processor 52, which operates according to stored instructions to move the text following the inserted matter into its proper position in document storage 54 and display storage 22.

If the word "Massachusetts" is required to be inserted in a number of places in a document that has previously been input to the system and is stored in document storage 54, the system user may wish to store the sequence of operations necessary to accomplish the insertion, and repetitively to access the stored sequence at the required locations in the document. This is accomplished, according to the invention, in the following way.

The user proceeds as though to input a new document into the system. The system assigns a document number to this document, as has been described, and stores the input characters in document storage 54 and display storage 22 in the usual manner. The document is displayed on screen 14 as it is input.

Index character. The user must first assign an "index character" to the sequence to be stored. This index character will be employed to recall the sequence. As has been described, the index character must be input in a prescribed form in order to be recognized as such. Specifically, in the present embodiment, the user must enclose the index character in parentheses and these characters must appear in the first three positions in the document. For example, the user may assign the character "a" to the sequence to be entered. Therefore, the user actuates keys to input (a)

into the system. These three characters are successively decoded in decoding circuit 42, which generates internal control signals which cause the internal representations of the characters to be stored in document storage 54 and display storage 22.

Text-modifying operations. The user next must input the text-modifying operation "insert" for storage. Since the insert operation is not to be carried out when entered, but rather at a later time on recall, the special condition key 170 is first actuated. The internal representation 1000 1111 of this key is applied to decoding circuit 42, where it sets the elements of the bistable arrays. Test circuit 78 detects the presence of this configuration, and outputs the SET=FIRST signal to set the flag in special condition flag register 80 to the first non-zero value.

The user next actuates the "insert" key 161. The internal representation of this key is applied to decoding circuit 42, where it sets the elements of the bistable arrays. Test circuit 74 does not detect the all-zero configuration; test circuit 77 does not find that the interactive flag has been set; test circuit 84 is therefore enabled, and tests the state of the special condition flag in register 80. This flag is found to be set (non-zero). Test circuit 85 is therefore enabled, and finds the SC flag in register 80 to be set to FIRST. Test circuit 83 therefore is enabled to test the representation on internal data bus 64 to determine whether it represents a character or an operation. Since the representation is of the "insert" operation, control signal 96 is output, which resets the special condition flag on register 80 and causes the internal representation of the "insert" key to be applied to addess the ∓key-name" table in block 60. The modified "key-name" representation (-INSERT-) is read out of block 60, and the ten internal representations of the ten characters comprising the key-name are written into document storage 54 and display storage 22. The display now shows (a) (-INSERT-)

Note that the instructions in control storage 28 for performing the insert operation are not accessed.

Test characters. The user next actuates the keys of keyboard 12 to input the word "Massachusetts". Each letter is decoded in circuit 42 and stored in document storage and display storage. The display now shows (a) (-INSERT-)Massachusetts The user must actuate the "execute" key 159 (string end indicator) in order to complete the operation. In order that this key form part of the stored sequence for later execution, actuation of this key must be preceded by actuation of the special condition key. In response to actuation of the special condition key, decoding circuit 42 sets the special condition flag to FIRST, the thereafter, when the internal representation of the "execute" key is decoded, detects its set condition. In response, the "key-name" table in block 60 is addressed, and the key-name "(-EXECUTE-) is written into document storage and display storage.

For the select/store circuit 44 to derive appropriate control signals to store the input signals for later recall, the characters must be underscored. The system user therefore underscores the input:

(a) (-INSERT-)Massachusetts(-EXECUTE-)

Comments. For the better understanding of other users, the user wishes to add a comment, not to be inserted into the text at a later time, that Massachusetts is a domicile. The word (domicile) is therefore entered into the system, but without underscoring:

(a) (-INSERT-)Massachusetts(-EXECUTE-) (domicile)

If the system user wishes to edit the input sequence, he actuates the text-modifying operational keys without first actuating the special input condition key. For example, the above display might be clearer if the index character were separated from the editing sequence intended for later recall. The user can (using the insert key as previously described, and the return key) insert a return into the display test, to achieve the following display:

(a)
(-INSERT-)Massachusetts(-EXECUTE-) (domicile)

The insert and return keys have been actuated to edit the present document, but will not affect the document which will be edited at a later time by recalling this sequence. This return is referred to as a "cosmetic" operation.

Termination condition. The system user must indicate that this is the end of the sequence to be stored for later recall. This is done by successively actuating the (-CANCEL-),(-EXECUTE-) keys on keyboard 12.

Select/store. The sequence of internal representations for this sequence of test and operations has been written into document storage 54. However, it is not yet accessible for recall and execution. The user must actuate the select/store key 172 on keyboard 12.

The internal representation of the select/store key (1001 1111) is applied to decoding circuit 42. Test circuit 90 detects this configuration of the elements of array 72, and outputs the internal control signal 92, which causes the system control means to read the currently accessed document in document storage 54. The representations comprising the document are read out and sequentially applied to select/store circuit 44. The first test circuit 112, enabled by the start select/store signal 92, tests the first three characters of the document for the required form for an index character. The first three characters are (a), which is in the required form. Therefore, the internal control signal 116 is derived, which controls the system to write the index character a into the index 58 of special condition storage in RAM 26, together with the address in special condition storage at which the sequence is to be stored.

The next internal representation retrieved from document storage 54 is 0000 0011, the representation of the return key, providing the "cosmetic" return. As is seen from FIG. 18, this representation is interpreted by display control 24 to generate a return graphic symbol on display 14. However, as has been discussed, this symbol cannot be underscored. Therefore test circuit 124 detects the "off" condition of the eighth bit of array 126 set by the representation, and outputs control signal 130 to control the retrieval of the next representation stored in document storage 54.

The next characters to be read out of document storage 54 are found by test circuit 124 to be underscored, and by test circuit 128 to be in the "key-name" format.

Internal control signal 134 is output, controlling the system to read the "key-name" table 60 at the location addressed by the "key-name" (-INSERT-), and to read out the internal (executable) representation of the "insert" key (1000 0011). This representation is written into special condition storage 56 at the location corresponding to the index character a.

The next characters read out of document storage 54, comprising the word Massachusetts, are each found to be underscored, and each is therefore tested for the key-name format. As each character is found not to be part of a key-name, an internal control signal is output causing the system to write the internal representations of the character (without the underscore) into special condition storage 56, following the representation of the "insert" key.

The key-name format of the (-EXECUTE-) sequence is detected by test circuit 128, which outputs a control signal causing the internal representation of the "execute" key to be written into special condition storage 56.

The next character is a left parenthesis. This is applied to set the elements of array 126, and test circuit 124 finds that the eighth bit of the array is "0". As a result, internal control signal 130 is output, causing the system to read the next character from document storage, while nothing is written into special condition storage. The remaining characters of the comment (domicile) are bypassed in this manner.

Finally, the termination condition is read out of document storage and is applied to select/store circuit 44. Test circuit 118 detects the configuration corresponding to this condition, and derives the internal control signal 122, which causes the system to write "0" into the special condition storage, and to enable interrupt circuit 32 (FIG. 6). The system is now able to accept further inputs from the keyboard.

The input sequence now exists in two different forms, stored in different places. First, the representations of the original input sequence, including key-names, comments, and cosmetic operations, continues to be stored in document storage 54. This document can be accessed in the conventional way for display, and can be edited like any other document. It can also be printed. Second, the selected sequence is stored in special condition storage. It cannot be displayed or printed; however, it can be recalled by actuation of the special condition key and the appropriate index character key, whereupon the system control means will respond to the stored selected sequence to store and display test from the selected sequence as part of the current document, or to modify the current document, as though the selected sequence had just been entered through the keyboard. The alterations become part of the document being edited. The stored selected sequence can be recalled again at any time for repetitive use.

Recall. Before recalling the stored sequence, the user must first access the document to be edited. Note that the document to be edited is not the same as the document created when the above sequence of characters and operations was input. The document to be edited is accessed by inputting its document number, previously assigned by the system, as has been described. The document is addressed in document storage 54, and is displayed (one screen load at a time) on screen 14.

The user moves the cursor by means of keys 162, 164, 166, and 168 to the first location where the insertion is to be made. The user then actuates special condition key 170. The internal representation 1000 1111 of this key is applied to decoding circuit 42, and is detected by test circuit 78. In response, the special condition flag in register 80 is set to FIRST.

The user then actuates the appropriate key to input the index character a. The internal representation of this character is applied to decoding circuit 42. The test flag circuits 84 and 85 are enabled, and detect the set to FIRST condition of the special condition flag. In response, test circuit 83 tests array 73 for character or operation, and when a character representation is found, internal control signal 86 is output, resetting the special condition flag, and causing the system control means to read index 58 in RAM 26 at the location corresponding to the character a. The address in special condition storage that is specified by the index is then applied to address special condition storage 56, and the interrupt circuit 32 is disabled. No inputs can be accepted from the keyboard until the stored sequence has been completely executed.

The representations of the stored sequence are read out from storage 56 onto data bus 64, and are applied sequentially to alternate buffer 19 (FIG. 7). Since the interrupt signal 34 is disabled, multiplexer 62 gates the stored sequence, one character at a time, onto internal data bus 64, where it is decoded, precisely as though the characters and text-modifying operations had been entered through the keyboard. The (-INSERT-) operation is carried out by processor 52; the word Massachusetts is inserted. The (-EXECUTE-) internal representation is decoded to indicate the end of a string of keystrokes and to control the processor 52 to complete the operation of "insert." Finally, the "0" representation is read out of special condition storage to decoding circuit 42, and is detected by test circuit 74. In response, internal control signal 76 is output, enabling interrupt circuit 32. The system will now accept subsequent input through the keyboard.

The system user can repetitively access the stored sequence of characters and operations by actuating the special condition key, followed by the key for the index character. The sequence will be executed at the location specified by the current position of the cursor.

Keyboard interactive operation (N-Keys)

According to the present invention, means are provided to permit interaction with the keyboard during recall of a stored sequence. By such means, the user can, for example, vary the input text during an "insert" operation forming part of a longer, more complex stored sequence. The keyboard interactive feature of the invention is of particular use in such operations as forms-filling. The operation of the keyboard interactive feature will be described, for simplicity, in connection with the "insert" operation previously explained, but it will be understood that its principal utility is found in connection with other text-editing operations.

Referring now to FIG. 3, the representation of the keyboard interactive or "N-keys" operation is input to the system by actuating the "command" key 173, followed by actuation of the quotation mark key 175. The particular means employed to input the operation representation is a matter of choice. The means disclosed have been employed because the "command" key can be combined with other keys to define a variety of special operations of the text-editing system. However, a single dedicated key could be employed to input the interactive operation signal.

Referring to FIG. 7, the "command" internal representation 1000 0001 is applied to decoder 42, and is detected by test circuit 75, which outputs the SET=-SECOND control signal to set the special condition flag in register 80 to its second non-zero value. Thereafter, the quotation mark key 175 inputs the internal representation 0010 0010 (hexidecimal "22"). When this representation is applied to decoder 42, test circuit 84 tests the special condition flag and finds it to be non-zero. Test circuit 85 thereupon tests the flag and finds that it has not been set to the FIRST value. Therefore, internal control signal 105 is output, to reset the SC flag, and to cause the read/write and address means to read the command table in block 61.

Referring to FIG. 20, the internal representation of the quotation mark key (0010 0010) is applied to address the command table, and the addressed element is the key-name representation (-N-KEYS-). This displayable representation is read out to document storage 54 and display storage 22.

The remainder of the sequence to be stored is then input in the manner that has been described previously.

Referring now to FIG. 8, when the "select/store" key 172 is actuated by the system user, the select/store operation is carried out in the manner that has been described. When the key-name (-N-KEYS-) is retrieved from document storage 54, the "key-name" format is detected in test circuit 128 of select/store circuit 44, as has been described, and internal control signal 134 is output to cause the address and read/write means of the system to read either block 60 or block 61. The particular key-name (-N-KEYS-) is employed by circuit 48 to cause addressing of block 61 rather than block 60. Referring again to FIG. 20, it is seen that the representation (-N-KEYS-) addresses the representation 1011 0001, which is read out and stored into special condition storage 56. Note that this executable representation (hexidecimal "B1") cannot be input directly through the keyboard. As is seen by referring to FIG. 16, keyboard inputtable representations have numerical values lower than hexidecimal "9A".

The remainder of the sequence is then selected and stored in the manner that has been described.

When the user recalls the sequence of which the keyboard interactive operation forms an element, the keyboard interrupt circuit 32 is disabled by circuit 83 in decoder 42 in response to the input of the index character, as has been described. Representations are retrieved sequentially from special condition storage, as has been described, and are applied to decoder 42, and the derived internal control signals control the system without input from the keyboard.

When the representation 1011 0001 (N-keys) is retrieved from SC storage 56, it is applied to decoder 42. The tests performed by test circuits 76, 77, 84, 78 and 75 each in turn have a negative result. Test circuit 95 is enabled, and tests the array 97 for the configuration 1011 0001. The result of this test is positive; circuit 95 outputs a SET signal to set the interactive flag in register 79, and outputs an internal control signal to enable interrupt circuit 32 and to cause circuit 48 to save the next address (address of the next representation in SC storage 56) in register 49.

The user can now input an arbitrary number (N) of characters and certain operations through the keyboard. The first internal representation from the keyboard is applied to decoder 42. Test circuit 77 tests the interactive flag in register 79, and finds that it has been set. The derived internal control signal 81 is output, which enables the "N-Keys" circuit (FIG. 19). The input internal representation is applied from decoder internal data bus 64 to set the bistable arrays 210 and 212. Test circuit 214 first tests the input representation for a numerical value less than hexidecimal "80". Referring to FIG. 16, it is seen that representations that meet this test are representations of characters or of certain simple text-modifying operations having displayable graphics (center, tab, return, indent, decimal align, stop, note, and merge). All other operations are excluded by this test.

If the result of the test performed by test circuit 214 is positive, an internal control signal 215 is derived that causes the internal representation on internal data bus 64 to be written into document storage 54 and display storage 22. That is, the character or operation becomes a part of the document currently being edited. If the result is negative, test circuit 216 is enabled, which tests the representation for the configuration 1000 0010, that of the execute key 159 (string and indicator) on keyboard 12. When this key is actuated, an internal control signal 218 is derived to disable the keyboard interrupt circuit 32 once again, and to restore the address saved in register 49. Signal 218 also resets the interactive flag in register 79 (FIG. 7B). Thereafter the saved address is output to address the next element in the stored sequence.

It will be seen that the keyboard interactive operation provides great flexibility in a text-editing system, since the capacity to store sequences, whose elements are selected by the system user, for repetitive use is further enhanced by the capacity to vary portions of the selected stored sequence according to the context in which it is recalled. For example, in forms-filling, the stored sequence can be composed of instructions to move the cursor successively to each of a number of positions on the form; the N-Keys operation is made part of the sequence after each repositioning of the cursor, permitting the user to enter whatever individual information is required at each position, after which the cursor is automatically moved to a new position.

What is claimed is:

1. In a text-editing system having
    keyboard signal input means for inputting signals including a select/store signal, a recall signal, a string and indicator signal, and character and text-editing operation signals,
    storage means including current document storage and special condition storage,
    display means including display control means and display storage,
    system control means connected to said signal input means, storage means, and display means and having
        read/write control means and
        addressing means for generating a next address for the next read/write operation,
    said system control means being responsive to said character and text-editing operation signals to control said addressing means and read/write control means for the text-editing operation of said system,
    said system control means being responsive to the input of said character and text-editing operation signals for controlling said addressing and read/write control means to store representations of said signals in said current document storage and said display storage,
    said system control means further comprising select/store means responsive to said select/store signal to select from said current document storage character and text-editing operation signals and to store said selected signals into said special condition storage,
    said system control means including means thereafter responsive to a said recall signal for normally disabling said keyboard signal input means, and retrieving said stored character and text-editing operation signals from said special condition storage and for operating according to said retrieved signals,
    that improvement wherein
        said system further comprises keyboard interactive operation means for permitting input of character signals through said keyboard during operation responsive to said recall signal,
        said keyboard signal input means further comprising means for inputting a keyboard interactive operation signal,
        said system control means further comprising a keyboard interactive operation circuit, an interactive flag, and a saved address register coupled to said addressing means and read/write control means,
        said system control means being responsive to said keyboard interactive operation signal to store an internal representation of said signal in said current document storage,
        said select/store means including means responsive to a retrieved said internal representation of said keyboard interactive operation signal for storing an executable representation of said keyboard interactive operation signal into said special condition storage,
        said system control means including means thereafter, during operation responsive to a said recall signal, responsive to a retrieved said executable representation of said keyboard interactive operation signal for enabling said keyboard signal input means, setting said interactive flag, and saving said next address in said saved address register,
        said keyboard interactive operation circuit including means thereafter responsive to said set interactive flag and to the keyboard input of said character signals for controlling said addressing means and read/write control means to store said character signals into said display storage and current document storage, and responsive to said set interactive flag and to the keyboard input of said string end indicator signal for disabling said keyboard signal input means, resetting said interactive flag, and restoring said saved next address.

2. In a text-editing system having
    keyboard signal input means for inputting signals including a select/store signal, a recall signal, a string end indicator signal, and character and text-editing operation signals in two alternative modes,
    storage means including current document storage and special condition storage,
    display means including display control means and display storage,
    system control means connected to said signal input means, storage means, and display means and having read/write control means and addressing means for generating a next address for the next read/write operation, said system control means being responsive to said character and text-editing operation signals to control said addressing means and read/write control means for the text-editing operation of said system, said system control means being responsive to the input of said character and text-editing operation signals in one of said alternative modes for controlling said addressing and read/write control means to store mode-modified representations of said signals in said current document storage and said display storage, said system control means further comprising select/store means responsive to said select/store signal to select from said current document storage character and text-editing operation signals modified according to a first said alternative mode and to store said selected signals into said special condition storage, said system control means including means thereafter responsive to a said recall signal for normally disabling said keyboard signal input means, and retrieving said stored character and text-editing operation signals from said special condition storage and for operating according to said retrieved signals, that improvement wherein said system further comprises keyboard interactive operation means for permitting input of signals through said keyboard during operation responsive to said recall signal, said keyboard signal input means further comprising means for inputting a keyboard interactive operation signal, said system control means further comprising a keyboard interactive operation circuit, an interactive flag, and a saved address register coupled to said addressing means and read/write control means, said system control means including means responsive to said keyboard interactive operation signal for storing an internal representation of said signal in said current document storage, said select/store means including means responsive to a retrieved said internal representation of said signal for storing an executable representation of said signal into said special condition storage, said system control means including means thereafter, during operation responsive to a said recall signal, responsive to a retrieved said executable representation of said signal for enabling said keyboard signal input means, setting said interactive flag, and saving said next address in said saved address register, said keyboard interactive operation circuit including means thereafter responsive to said set interactive flag and to the keyboard input of said character signals for storing said character signals into said display storage and current document storage, and responsive to the keyboard input of said string end indicator signal for disabling said keyboard signal input means, resetting said interactive flag, and restoring said saved next address.

3. In a text-editing system having keyboard signal input means for inputting signals including a select/store signal, a recall signal, a string end indicator signal, a special input condition signal, and character and text-editing operation signals in two alternative modes, storage means comprising current document storage, special condition storage, display storage, and read-only key-name storage containing a set of displayable representations each corresponding to a said text-modifying operation signal, display means including display control means connected to said display storage, system control means connected to said signal input means, storage means, and display means and having read/write control means and addressing means for generating a next address for the next read/write operation, said system control means including means responsive to said character and text-editing operation signals for controlling said addressing means and read/write control means for the text-editing operation of said system, said system control means being responsive to the input of said character and text-editing operation signals in one of said alternative modes for controlling said addressing and read/write control means to store mode-modified representations of said signals in said current document storage and said display storage, said system control means including means responsive to the input of a said text-editing operation signal in association with said special input condition signal for deriving internal control signals for controlling said address control and read/write control means to address said key-name storage to access a said displayable representation corresponding to said operation and for storing said representation into said current document storage and said display storage, said displayable representation being composed of character representations, said system control means further comprising select/store means responsive to said select/store signal to select from said current document storage character representations modified according to a first said alternative mode and to store said selected character representations into said special condition storage, said select/store means including means responsive to a said retrieved displayable operation representation composed of modified character representations for storing an executable representation of said operation in said writable special condition storage, said system control means including means thereafter responsive to a said recall signal for normally disabling said keyboard signal input means, and retrieving said stored character representations and executable operation representations from said special condition storage and to operate according to said retrieved representations, that improvement wherein said system further comprises keyboard interactive operation means for permitting input of signals through said keyboard during operation responsive to said recall signal, said keyboard signal input means further comprising means for inputting a keyboard interactive operation signal, said key-name storage further containing a displayable representation corresponding to said keyboard interactive operation signal, said system control means further comprising a keyboard interactive operation circuit, an interactive flag, and a saved address register coupled to said addressing means and read/write control means, said system control means including means responsive to said keyboard interactive operation signal for deriving internal control signals for controlling said address control and read/write control means to address said key-name storage to access said displayable representation corresponding to said keyboard interactive operation signal, and for storing said representation into said current document storage and said display storage, said select/store means including means responsive to said select/store signal and to a retrieved and displayable representation of said keyboard interactive operation signal for storing an executable representation of said signal into said special condition storage, said system control means including means thereafter, during operation responsive to a said recall signal, responsive to a retrieved said executable representation of said signal for enabling said keyboard signal input means, setting said interactive flag, and saving said next address in said saved address register, said keyboard interactive operation circuit including means thereafter responsive to said set interactive flag and to the keyboard input of character signals for storing said character signals into said display storage and current document storage, and responsive to the keyboard input of said string end indicator signal to for disabling said keyboard signal input means, resetting said interactive flag, and restoring said saved next address.

* * * * *

UNITED STATES PATENT AND TRADEMARK OFFICE
CERTIFICATE OF CORRECTION

PATENT NO. : 4,198,685
DATED : April 15, 1980
INVENTOR(S) : Daniel W. Corwin et al.

It is certified that error appears in the above-identified patent and that said Letters Patent are hereby corrected as shown below:

| | | |
|---|---|---|
| Under References Cited | | "4,020,024" should be --4,040,024--; |
| Column 4 | line 32 | "alpha-numeric" should be --alphanumeric--; |
| Column 5 | line 37 | "alpha-numeric" should be --alphanumeric--; |
| Column 5 | line 44 | "alpha-numeric" should be --alphanumeric--; |
| Column 5 | line 53 | "(lower case)" should be --(lowercase)--; |
| Column 5 | line 55 | "(upper case)" should be --(uppercase)--; |
| Column 5 | line 62 | "have" should be --having--; |
| Column 7 | line 8 | "twenty four" should be --twenty-four--; |

UNITED STATES PATENT AND TRADEMARK OFFICE
CERTIFICATE OF CORRECTION

PATENT NO.  : 4,198,685
DATED       : April 15, 1980
INVENTOR(S) : Daniel W. Corwin et al.

It is certified that error appears in the above-identified patent and that said Letters Patent are hereby corrected as shown below:

| | | |
|---|---|---|
| Column 7  | line 30      | "text editing" should be --text-editing--; |
| Column 7  | line 53      | "954,704" should be --959,704--; |
| Column 8  | line 32      | "⇌" should be --"--; |
| Column 8  | line 39      | "upper-case" should be --uppercase--; |
| Column 8  | line 46      | "represenations" should be --representations--; |
| Column 8  | lines 46-47  | "upper case" should be --uppercase--; |
| Column 9  | line 28      | "arry" should be --array--; |
| Column 9  | line 67      | "(key names)" should be --(key-names)--; |
| Column 10 | line 55      | "81" should be --"81"--; |

UNITED STATES PATENT AND TRADEMARK OFFICE
CERTIFICATE OF CORRECTION

PATENT NO. : 4,198,685
DATED : April 15, 1980
INVENTOR(S) : Daniel W. Corwin et al.

It is certified that error appears in the above-identified patent and that said Letters Patent are hereby corrected as shown below:

| | | |
|---|---|---|
| Column 10 | line 57 | "Command" should be --command--; |
| Column 11 | line 2 | "(N-keys)" should be --(N-Keys)--; |
| Column 11 | line 16 | "N-keys" should be --N-Keys--; |
| Column 11 | lines 29-30 | "1001 1111" should be --"1001 1111"--; |
| Column 13 | line 32 | "("N-KEYS")" should be --("N-Keys")-- |
| Column 14 | line 40 | "64" should be --64K--; |
| Column 14 | line 42 | "56K." should be --56K,--; |
| Column 14 | line 47 | "sixteen bit" should be --sixteen-bit--; |
| Column 15 | line 3 | "“1“" should be --“1”--; |
| Column 16 | line 8 | "off" should be --of--; |

UNITED STATES PATENT AND TRADEMARK OFFICE
CERTIFICATE OF CORRECTION

PATENT NO. : 4,198,685
DATED : April 15, 1980
INVENTOR(S) : Daniel W. Corwin et al.

It is certified that error appears in the above-identified patent and that said Letters Patent are hereby corrected as shown below:

| | | |
|---|---|---|
| Column 17 | line 2 | "1000 0001" should be --"1000 0001"--; |
| Column 17 | line 2 | "Command" should be --command--; |
| Column 17 | lines 4-5 | "1011 0001" should be --"1011 0001"--; |
| Column 17 | line 22 | "MASSACHUSETTS" should be --Massachusetts--; |
| Column 17 | line 56 | "Index character." should be --<u>Index character.</u>--; |
| Column 18 | line 7 | "Text-modifying operations." should be --<u>Text-modifying operations.</u>--; |
| Column 18 | line 32 | "on" should be --in--; |
| Column 18 | line 34 | "≠" should be --"--; |
| Column 18 | lines 43-44 | "performing" should be --<u>performing</u>--; |

UNITED STATES PATENT AND TRADEMARK OFFICE
CERTIFICATE OF CORRECTION

PATENT NO. : 4,198,685
DATED : April 15, 1980
INVENTOR(S) : Daniel W. Corwin et al.

It is certified that error appears in the above-identified patent and that said Letters Patent are hereby corrected as shown below:

| | | |
|---|---|---|
| Column 18 | line 44 | "not" should be --not--; |
| Column 18 | line 45 | "Test characters." should be --Test characters.--; |
| Column 18 | line 62 | """ should be deleted; |
| Column 19 | line 3 | "Comments." should be --Comments.--; |
| Column 19 | line 29 | "Termination condition." should be --Termination condition.--; |
| Column 19 | line 33 | "Select/store." should be --Select/store.--; |
| Column 19 | line 34 | "test" should be --text--; |
| Column 20 | line 45 | "selected" should be --selected--; |
| Column 20 | line 50 | "test" should be --text--; |

UNITED STATES PATENT AND TRADEMARK OFFICE
CERTIFICATE OF CORRECTION

PATENT NO. : 4,198,685
DATED : April 15, 1980
INVENTOR(S) : Daniel W. Corwin et al.

It is certified that error appears in the above-identified patent and that said Letters Patent are hereby corrected as shown below:

| | | |
|---|---|---|
| Column 20 | line 57 | "Recall." should be --<u>Recall.</u>--; |
| Column 21 | line 59 | ""N-keys"" should be --"N-Keys"--; |
| Column 22 | line 53 | "N-keys" should be --N-Keys--; |
| Column 22 | line 58 | "1011 0001" should be --"1011 0001"--; |
| Column 23 | line 20 | "1000 0010" should be --"1000 0010"--; |
| Column 23 | line 47 | "string and" should be --string end--; |
| Column 28 | line 2 | "retrieved and" snould be --retrieved said--; |
| Column 28 | line 20 | delete "to". |

Signed and Sealed this

Sixteenth Day of September 1980

[SEAL]

Attest:

SIDNEY A. DIAMOND

Attesting Officer     Commissioner of Patents and Trademarks